United States Patent
Noma et al.

(10) Patent No.: US 9,140,157 B2
(45) Date of Patent: Sep. 22, 2015

(54) EXHAUST GAS PURIFICATION SYSTEM

(75) Inventors: Yasuo Noma, Osaka (JP); Taichi Togashi, Osaka (JP); Tomohiro Fukuda, Osaka (JP); Atsushi Ohta, Osaka (JP); Katsunari Jounouchi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 360 days.

(21) Appl. No.: 13/695,863

(22) PCT Filed: Apr. 28, 2011

(86) PCT No.: PCT/JP2011/060461
§ 371 (c)(1),
(2), (4) Date: Dec. 14, 2012

(87) PCT Pub. No.: WO2011/138928
PCT Pub. Date: Nov. 10, 2011

(65) Prior Publication Data
US 2013/0091831 A1  Apr. 18, 2013

(30) Foreign Application Priority Data

May 7, 2010  (JP) ................. 2010-107344
May 7, 2010  (JP) ................. 2010-107346
May 7, 2010  (JP) ................. 2010-107347

(51) Int. Cl.
*F01N 3/00*       (2006.01)
*F01N 3/023*      (2006.01)
*F01N 9/00*       (2006.01)
F01N 3/035        (2006.01)
F02D 41/02        (2006.01)
F02D 41/14        (2006.01)
F02D 41/22        (2006.01)

(52) U.S. Cl.
CPC .............. *F01N 3/023* (2013.01); *F01N 3/0235* (2013.01); *F01N 9/002* (2013.01); *F02D 41/029* (2013.01); *F01N 3/035* (2013.01); *F01N 2240/36* (2013.01); *F02D 41/0245* (2013.01); *F02D 41/1446* (2013.01); *F02D 2041/227* (2013.01); *F02D 2041/228* (2013.01); *Y02T 10/47* (2013.01)

(58) Field of Classification Search
CPC ....... F01N 3/023; F01N 3/0235; F01N 9/002; F01N 2240/36; F01N 3/035; F02D 41/029; F02D 2041/227; F02D 2041/228; F02D 41/0245; F02D 41/1446; Y02T 10/47
USPC .................................. 60/286, 295, 297, 311
See application file for complete search history.

(56) References Cited

U.S. PATENT DOCUMENTS

2002/0078681 A1*  6/2002  Carberry et al. ................ 60/280

FOREIGN PATENT DOCUMENTS

JP      2000-145430      5/2000
JP      2003-003829      1/2003
(Continued)

*Primary Examiner* — Jason Shanske
*Assistant Examiner* — Matthew T Largi
(74) *Attorney, Agent, or Firm* — Jordan and Hamburg LLP

(57) ABSTRACT

An exhaust gas purification device is arranged in an exhaust gas route of a common rail type engine. At least one of an intake air throttle device and an exhaust gas throttle device are arranged in intake and exhaust systems of the engine. In the case that a clogged state of the exhaust gas purification device becomes equal to or more than a prescribed level, an auxiliary renewing mode which raises the temperature of an exhaust gas from the engine by actuating at least one of the intake air throttle device and the exhaust gas throttle device is executed, and in the case that the clogged state of the exhaust gas purification device is not improved even by executing the auxiliary renewing mode, a forced renewing mode which supplies a fuel into the exhaust gas purification device by a post injection is executed.

15 Claims, 13 Drawing Sheets

(56) References Cited

FOREIGN PATENT DOCUMENTS

| JP | 2003-027922 | | | 1/2003 | | |
| JP | 2003003829 | A | * | 1/2003 | ................ | F01N 3/02 |
| JP | 2005-069148 | | | 3/2005 | | |
| JP | 2005-113752 | | | 4/2005 | | |
| JP | 2005113752 | A | * | 4/2005 | ................ | F01N 3/02 |
| JP | 2005-139944 | | | 6/2005 | | |
| JP | 2009-257323 | | | 11/2009 | | |

* cited by examiner

US 9,140,157 B2

EXHAUST GAS PURIFICATION SYSTEM

BACKGROUND OF THE INVENTION

The present invention relates to an exhaust gas purification system with respect to an engine which is mounted to a working machine, for example, a construction machine, an agricultural machine and an engine generator.

In recent years, as an application of an emission control of a high order with regard to a diesel engine (hereinafter, refer simply to as an engine), it is going to be desired to mount an exhaust gas purification device which purifies an air pollutant in an exhaust gas, to a construction machine, an agricultural machine and an engine generator to which the engine is mounted. As the exhaust gas purification device, a diesel particulate filter (hereinafter, refer to as DPF) has been known (refer to Patent Documents 1 and 2). The DPF is provided for collecting a particulate matter (hereinafter, refer to as PM) or the like. In this case, if the PM which is collected by the DPF exceeds a prescribed amount, a distribution resistance within the DPF is increased and thereby causing a reduction of an engine output. Accordingly, it is also frequently carried out to remove the PM which is deposited in the DPF on the basis of a temperature rise of the exhaust gas so as to bring back a PM collecting capacity of the DPF (renew the DPF).

CITATION LIST

Patent Document 1: Japanese Patent Application Laid-open No. 2000-145430
Patent Document 2: Japanese Patent Application Laid-open No. 2003-27922

SUMMARY OF INVENTION

In the meantime, the engine is mounted to various working machines, for example, a construction machine, an agricultural machine and an engine generator. Accordingly, in an engine with a DPF, even if a DPF renewing motion is executed by rising an exhaust gas temperature, there may be a case that a DPF purifying capacity is not sufficiently recovered (a case that the renewal is not sufficient). In this regard, if the engine with the DPF is of a common rail type (a fuel injection device is of a common rail type), it is possible to promote the DPF renewal by a positive heating that a fuel is supplied into the DPF by a post injection so as to be burnt.

However, in an aspect that the fuel is supplied into the DPF by the post injection so as to positively burn the PM, there has been a problem that a fuel consumption is widely deteriorated in the case that a frequency of the post injection is high (the number of times is increased), and an unburnt fuel stays within each of cylinders of the engine so as to dilute an engine oil, thereby causing a durability deterioration of the engine.

Further, for example, in the case that an operation state in which a sufficient temperature rising action can not be obtained goes on, even if the post injection is executed, the PM is excessively deposited within the DPF. If the DPF renewing motion is executed under the condition mentioned above, there is brought about an adverse effect that a crack is generated in the DPF or the DPF is melted away due to a rapid combustion (a runaway combustion) of the PM which is excessively deposited. Further, in the case that the runaway combustion is generated within the DPF, it is necessary to secure a minimum traveling function in the working machine which is mounted with the engine with a DPF, as well as prompting an appropriate inspection and maintenance, for example, at service bases.

A first object of the present invention is to make an improvement of a fuel consumption and an avoidance of an engine oil dilution compatible, to prevent a particulate matter from being excessively deposited within the exhaust gas purification device and to secure a minimum traveling function in a working machine in the case that a runaway combustion is generated within an exhaust gas purification device.

Since it is necessary to raise an exhaust gas temperature (apply a thermal energy to an exhaust gas) in the case that the DPF is renewed in the conventional structure, an engine output is enlarged by increasing a fuel consumption rate to exceed an operation amount of an accelerator operating device such as a throttle lever or an accelerator petal. Accordingly, since a shock due to a fluctuation of an engine torque and a change of an engine sound are generated, an uncomfortable feeling is applied to an operator. It is impossible to deny a possibility that the operator erroneously recognizes a sudden shock and the change of the engine sound as an abnormality. Particularly, in the construction machine such as a hydraulic shovel which executes a careful work on the basis of the engine sound, the sudden shock and the change of the engine sound which are generated at the time of DPF renewal are never preferable.

A second object of the present invention is to dissolve a problem that an uncomfortable feeling is applied to an operator due to a shock and a change of an engine sound caused by a fluctuation of an engine torque, at the time of renewal of the exhaust gas purification device.

According to a first aspect of the invention, there is provided an exhaust gas purification system, the exhaust gas purification system including an exhaust gas purification device which is arranged in an exhaust gas route of a common rail type engine, and at least one of an intake air throttle device and an exhaust gas throttle device which are arranged in intake and exhaust systems of the engine, wherein in the case that a clogged state of the exhaust gas purification device becomes equal to or more than a prescribed level, an auxiliary renewing mode which raises a temperature of an exhaust gas from the engine by actuating at least one of the intake air throttle device and the exhaust gas throttle device is executed, and in the case that the clogged state of the exhaust gas purification device is not improved even by executing the auxiliary renewing mode, a forced renewing mode which supplies a fuel into the exhaust gas purification device by a post injection is executed.

According to a second aspect of the invention, there is provided the exhaust gas purification system as recited in the first aspect, wherein in the case that an accumulated drive time of the engine is equal to or more than a set time which is previously set, the mode is changed to the forced renewing mode regardless of the clogged state of the exhaust gas purification device.

According to a third aspect of the invention, there is provided the exhaust gas purification system as recited in the second aspect, wherein the accumulated drive time of the engine is reset and is newly started measuring after the execution of the forced renewing mode.

According to a fourth aspect of the invention, there is provided the exhaust gas purification system as recited in the first aspect, wherein in the case that the clogged state of the exhaust gas purification device is not improved even by executing the forced renewing mode, an emergency renewing mode which supplies the fuel into the exhaust gas purification device by the post injection and maintains a rotating speed of the engine at a predetermined value is executed.

According to a fifth aspect of the invention, there is provided the exhaust gas purification system as recited in the fourth aspect, wherein in the case that a temperature of an exhaust gas within the exhaust gas purification device becomes equal to or more than an abnormal temperature after the execution of the emergency renewing mode, a limp home mode which limits upper limit threshold values of a rotating speed and a torque of the engine, and a drivable time of the engine is executed.

According to a sixth aspect of the invention, there is provided the exhaust gas purification system as recited in the fifth aspect, wherein the mode can not be changed to the other mode than the limp home mode even by restarting the engine, after the execution of the limp home mode.

According to a seventh aspect of the invention, there is provided the exhaust gas purification system as recited in the fifth aspect, wherein in the case that the current rotating speed and torque in the engine are greater than the upper limit threshold values, the rotating speed and the torque of the engine are lowered little by little to the upper limit threshold values under the execution of the limp home mode.

According to an eighth aspect of the invention, there is provided the exhaust gas purification system as recited in any one of the fifth to seventh aspects, further including abnormally high temperature informing means which is actuated in the case that the temperature of the exhaust gas within the exhaust gas purification device is equal to or higher than the abnormal temperature.

According to a ninth, aspect of the invention, there is provided the exhaust gas purification system as recited in the first aspect, further including renewal advance notifying means which is actuated in the case that the clogged state of the exhaust gas purification device becomes equal to or more than a prescribed level, and renewal admittance input means which allows an execution of the auxiliary renewing mode or the forced renewing mode, wherein the auxiliary renewing mode or the forced renewing mode is executed when an allowing operation of the renewal admittance input means is carried out under actuation of the renewal advance notifying means.

According to a tenth aspect of the invention, there is provided the exhaust gas purification system as recited in the ninth aspect, wherein the rotating speed of the engine is made higher than a low idle rotating speed, in an idling state of the engine, under execution of the auxiliary renewing mode or the forced renewing mode.

According to an eleventh aspect of the invention, there is provided the exhaust gas purification system as recited in the tenth aspect, wherein the rotating speed of the engine in the idling state is a high idle rotating speed which is higher than the low idle rotating speed, under execution of the auxiliary renewing mode or the forced renewing mode.

According to a twelfth aspect of the invention, there is provided the exhaust gas purification system as recited in any one of the ninth to eleventh aspects, wherein in the case that the clogged state of the exhaust gas purification device is improved after the execution of the auxiliary renewing mode or the forced renewing mode, the mode is returned to a normal operation mode.

According to the invention of the first aspect, since the exhaust gas purification system includes the exhaust gas purification device which is arranged in the exhaust gas route of the common rail type engine, and at least one of the intake air throttle device and the exhaust gas throttle device which are arranged in the intake and exhaust systems of the engine, and in the case that the clogged state of the exhaust gas purification device becomes equal to or more than the prescribed level, the auxiliary renewing mode which raises the temperature of the exhaust gas from the engine by actuating at least one of the intake air throttle device and the exhaust gas throttle device is executed and in the case that the clogged state of the exhaust gas purification device is not improved even by executing the auxiliary renewing mode, the forced renewing mode which supplies the fuel into the exhaust gas purification device by the post injection, is executed, the temperature of the exhaust gas from the engine is raised by increasing the output of the engine by the restriction of the intake air amount or the exhaust gas amount using at least one of the intake air throttle device and the exhaust gas throttle device, in the case that the clogging is generated in the exhaust gas purification device under the normal operation condition. Further, in the case that the clogged state of the exhaust gas purification device is not improved even by executing the auxiliary renewing mode, the temperature of the exhaust gas within the exhaust gas purification device is raised by supplying the fuel into the exhaust gas purification device by the post injection so as to burn.

In other words, whereas the temperature of the exhaust gas from the engine is raised in the auxiliary renewing mode, the temperature of the exhaust gas within the exhaust gas purification device is locally raised in the forced renewing mode, accordingly it is possible to forcibly and efficiently burn and remove the particulate matter within the exhaust gas purification device in the forced renewing mode in comparison with the case of the auxiliary renewing mode. In addition, since the auxiliary renewing mode is executed in the case that the clogging is generated in the exhaust gas purification device under the normal operation condition, it is possible to lower an execution frequency of the forced renewing mode, that is, an execution frequency of the post injection. Accordingly, it is possible to achieve an effect of suppressing a deterioration of a fuel consumption, and it is possible to suppress a deterioration of a durability of the engine which is caused by a dilution of the engine oil.

According to the invention of the second aspect, since in the case that the accumulated drive time of the engine is equal to or more than the set time which is previously set, the mode is changed to the forced renewing mode regardless of the clogged state of the exhaust gas purification device, it is possible to lower the execution frequency of the forced renewing mode, that is, the execution frequency of the post injection in the same manner as the case of the first aspect. Accordingly, it is possible to achieve the effect of suppressing the deterioration of the fuel consumption, and it is possible to suppress the deterioration of the durability of the engine which is caused by the dilution of the engine oil. Further, for example, in the case that a deposition amount of the particulate matter is estimated by using a differential pressure within the exhaust gas purification device, since a displacement of the accumulated deposition amounts (the estimated mounts) can be reset per the set time by the execution of the forced renewing mode, there is an advantage that it is possible to secure a reliability of a control relating to the renewal of the exhaust gas purification device.

According to the invention of the third aspect, since the accumulated drive time of the engine is reset and is newly started measuring after the execution of the forced renewing mode, it is possible to achieve an effect that it is not necessary for the operator to carry out a reset operation, for example, of the accumulated drive time, and it is possible to smoothly carry out the execution per the set time of the forced renewing mode while omitting the operation of the operator.

According to the invention of the fourth aspect, since in the case that the dogged state of the exhaust gas purification device is not improved even by executing the forced renewing mode, the emergency renewing mode which supplies the fuel into the exhaust gas purification device by of the post injection and maintains the rotating speed of the engine at the predetermined value is executed, it is possible to prevent the particulate matter within the exhaust gas purification device from being increased to an excessively deposited state which may cause a runaway combustion, and it is possible to inhibit the runaway combustion of the particulate matter from being generated within the exhaust gas purification device. Therefore, it is possible to achieve an effect of preventing a malfunction of the exhaust gas purification device and the engine which is caused by the excessive deposition of the particulate matter.

According to the invention of the fifth aspect, since in the case that the temperature of the exhaust gas within the exhaust gas purification device becomes equal to or more than the abnormal temperature after the execution of the emergency renewing mode, the limp home mode which limits the upper limit threshold values of the rotating speed and the torque of the engine, and the drivable time of the engine is executed, the engine is maintained in a minimum drive state by the execution of the limp home mode, in the state in which the runaway combustion of the particulate matter is thought to be generated within the exhaust gas purification device. In other words, it is possible to secure a minimum traveling function in the working machine to which the engine is mounted. Accordingly, it is possible to get out the working machine, for example, from a work area or move the working machine to a dealership or a service center and evacuate the working machine to a safety area while preventing a breakage (a meltaway) of the exhaust gas purification device, and an excessive emission discharge.

According to the invention of the sixth aspect, since the mode can not be changed to the other mode than the limp home mode even by restarting the engine, after the execution of the limp home mode, the exhaust gas purification device is more likely to be damaged once the limp home mode is executed, however, it is necessary to inspect and maintain, for example, in a dealership or a service center. Accordingly, there is an advantage that it is possible to avoid a risk that the exhaust gas purification device is used in a damaged state, and it is possible to prevent the excessive emission discharge.

According to the invention of the seventh aspect, since in the case that the current rotating speed and torque in the engine are greater than the upper limit threshold values, the rotating speed and the torque of the engine are lowered little by little to the upper limit threshold values under the execution of the limp home mode, it is possible to prevent the rotating speed and the torque from being rapidly changed (lowered) in the case that the mode is changed to the limp home mode. Accordingly, it is possible to achieve an effect of avoiding a problem that the operator can not deal and an engine stall is caused, by doing away with an uncomfortable feeling of the operator at the time of execution of the limp home mode.

According to the invention of the eighth aspect, since the exhaust gas purification system includes the abnormally high temperature informing means which is actuated in the case that the temperature of the exhaust gas within the exhaust gas purification device is equal to or higher than the abnormal temperature, it is possible to achieve an effect of informing the operator of the exhaust gas temperature abnormality (the runaway combustion) on the basis of the information of the abnormally high temperature informing means, thereby contributing to the prevention of expansion in the damage such as the melting of the exhaust gas purification device.

According to the invention of the ninth aspect, since the exhaust gas purification system includes the renewal advance notifying means which is actuated in the case that the clogged state of the exhaust gas purification device becomes equal to or more than the prescribed level, and the renewal admittance input means which allows the actuation of the renewing device, and the auxiliary renewing mode or the forced renewing mode is executed when the allowing operation of the renewal admittance input means is carried out under actuation of the renewal advance notifying means, it is possible to inhibit the renewing motion of the exhaust gas purification device by not carrying out the allowing operation of the renewal admittance input means. In other words, it is possible to inhibit the renewing motion of the exhaust gas purification device on the basis of an intention of the operator depending on a state or the like of the working machine to which the engine is mounted. Accordingly, in spite of the structure which can execute the renewing control for recovering the particulate matter collecting capacity of the exhaust gas purification device, it is possible to smoothly carry out a careful work which the operator executes on the basis of the engine sound. In other words, it is possible to achieve an effect of avoiding a defect in the exhaust gas purification device renewing motion which may obstruct the careful work.

According to the invention of the tenth aspect, since the rotating speed of the engine is made higher than the low idle rotating speed, in the idling state of the engine, under execution of the auxiliary renewing mode or the forced renewing mode, it is easy to hold the temperature of the exhaust gas from the engine in a high temperature state. Accordingly, it is possible to reduce a frequency of execution of the exhaust gas purification device renewing motion or shorten a time of execution, and it is possible to achieve an effect of an efficiency of the renewal of the exhaust gas purification device, to contribute to suppression of deterioration of the fuel consumption.

According to the invention of the eleventh aspect, since the rotating speed of the engine in the idling state is the high idle rotating speed which is higher than the low idle rotating speed, under execution of the auxiliary renewing mode or the forced renewing mode, it is possible to set the temperature of the exhaust gas from the engine to a higher temperature state. Therefore, an effect that the efficiency of the renewal of the exhaust gas purification device can be further promoted.

According to the invention of the twelfth aspect, since in the case that the clogged state of the exhaust gas purification device is improved after the execution of the auxiliary renewing mode or the forced renewing mode, the mode is returned to the normal operation mode, it is not necessary for the operator to carry out the returning operation, for example, for changing the mode. Therefore, it is possible to achieve an effect that a labor hour can be saved and the operating load of the operator can be lightened.

DESCRIPTION OF THE PREFERRED EMBODIMENTS

A description will be given below of an embodiment which embodies the present invention on the basis of the accompanying drawings.

(1) Structure of Engine and Periphery of the Same in First Embodiment

Figure 1:
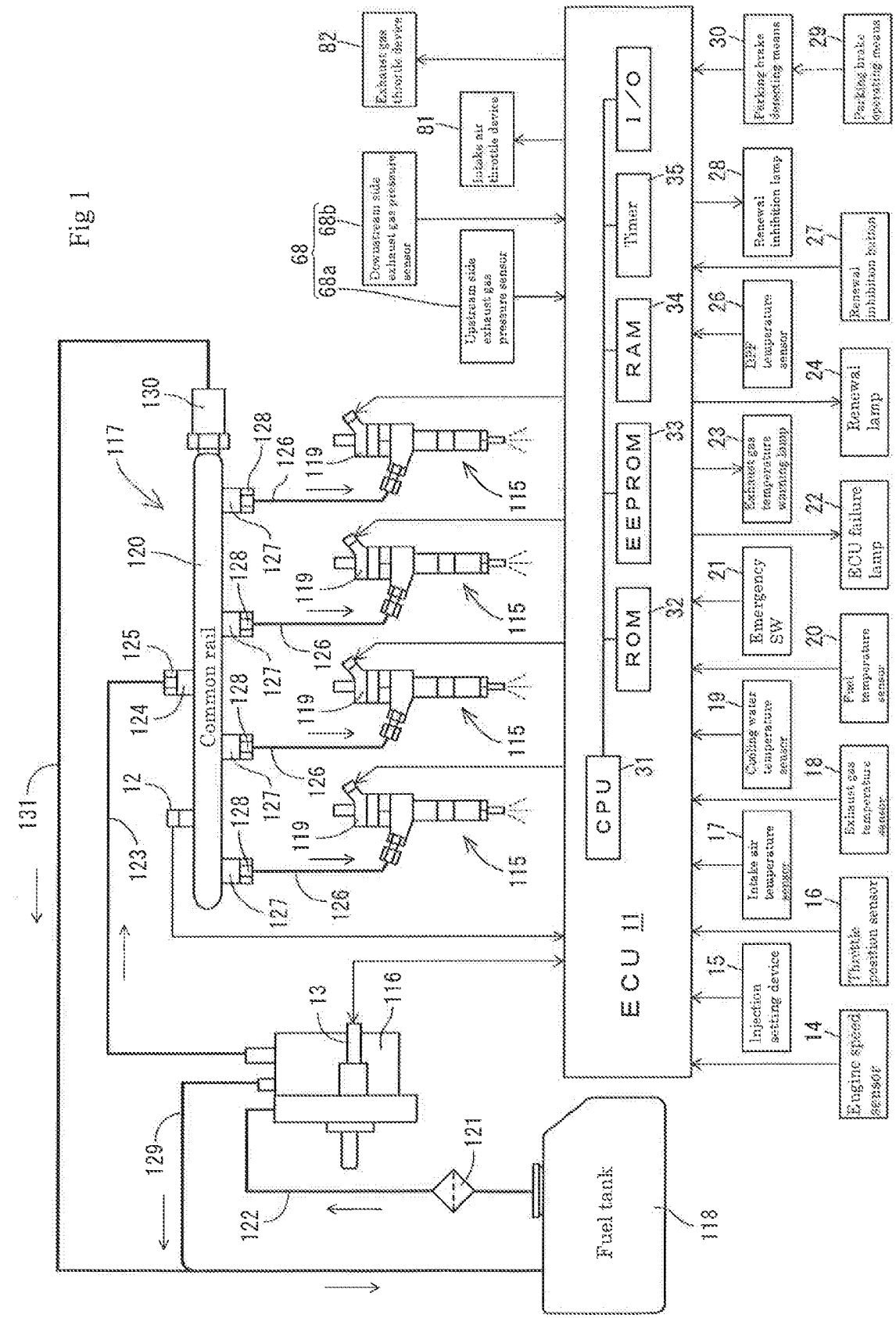
FIG. 1 is an explanatory view of a fuel system of an engine in a first embodiment.
Figure 2:
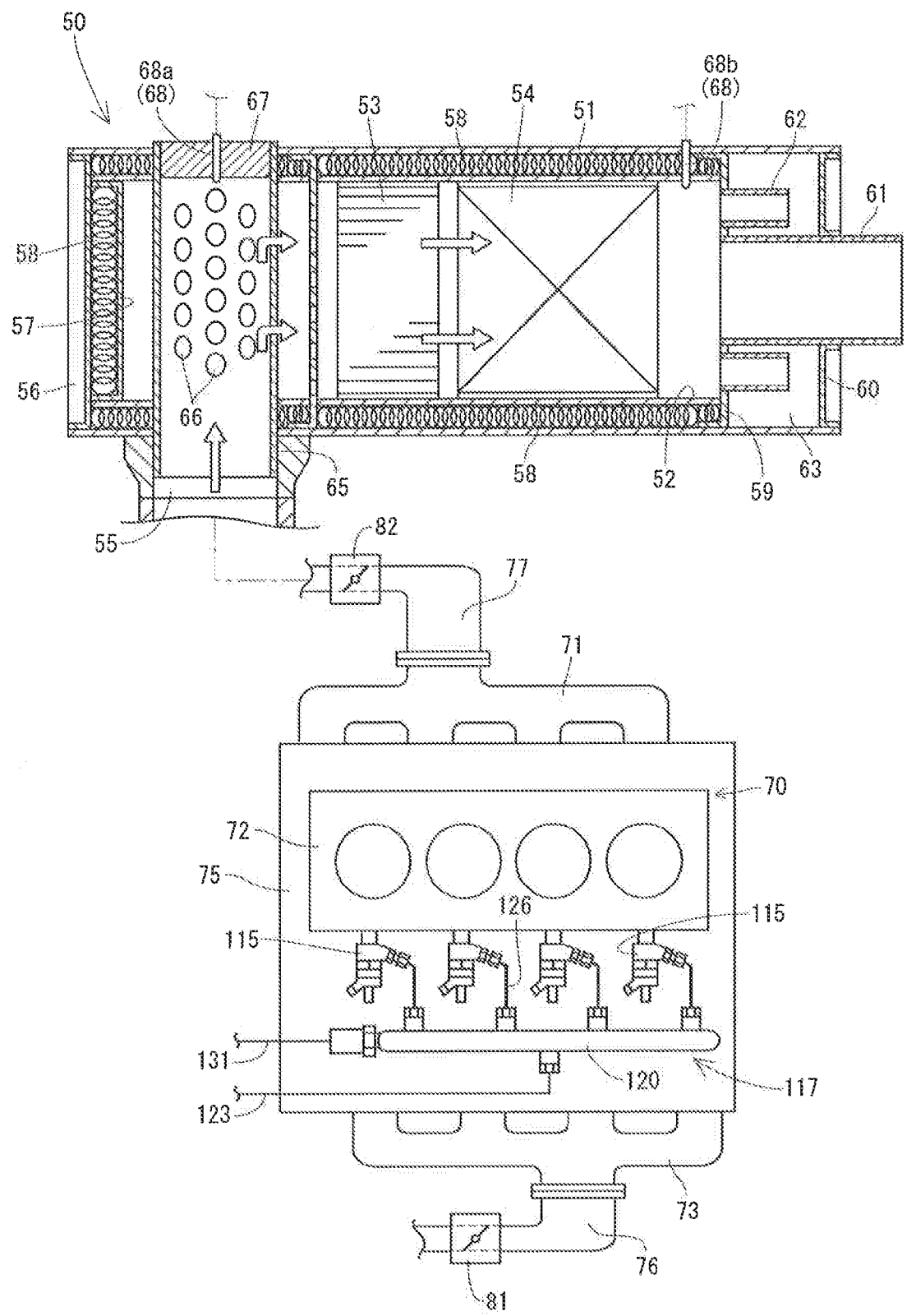
FIG. 2 is a function block diagram showing a relationship between the engine and an exhaust gas purification device.

FIG. 1 to FIG. 8 show a first embodiment of the present invention. First of all, a description will be given of a structure of an engine 70 and a periphery of the same with reference to FIG. 1 and FIG. 2. As shown in FIG. 2, the engine 70 is a four-cylinder type diesel engine, and is provided in an upper face with a cylinder block 75 to which a cylinder head 72 is fastened. An intake manifold 73 is connected to one side face of the cylinder head 72, and an exhaust manifold 71 is connected to the other side face. A common rail system 117 which supplies a fuel to each of cylinders of the engine 70 is provided below the intake manifold 73 in a side face of the cylinder block 75. An intake air throttle device 81 for regulating an intake air pressure (an amount of intake air) of the engine 70 and an air cleaner (not shown) are connected to an intake pipe 76 which is connected to an air intake upstream side of the intake manifold 73.

As shown in FIG. 1, a fuel tank 118 is connected to each of injectors 115 for four cylinders in the engine 70 via a common rail system 117 and a fuel supply pump 116. Each of the injectors 115 is provided with a fuel injection valve 119 of an electromagnetically opening and closing control type. The common rail system 117 is provided with a cylindrical common rail 120. The fuel tank 118 is connected to an air intake side of the fuel supply pump 116 via a fuel filter 121 and a low pressure pipe 122. A fuel within the fuel tank 118 is sucked into the fuel supply pump 116 via the fuel filter 121 and the low pressure pipe 122. The fuel supply pump 116 of the embodiment is arranged in the vicinity of the intake manifold 73. On the other hand, the common rail 120 is connected to an air discharge side of the fuel supply pump 116 via a high pressure pipe 123. The injectors 115 for four cylinders are connected to the common rail 120 via four fuel injection pipes 126.

In the structure mentioned above, the fuel in the fuel tank 118 is pressure fed to the common rail 120 by the fuel supply pump 116, and the fuel having the high pressure is stored in the common rail 120. Each of the fuel injection valves 119 is controlled to be opened and closed, whereby the fuel having the high pressure within the common rail 120 is injected to each of the cylinders of the engine 70 from each of the injectors 115. In other words, an injection pressure, an injection timing, and an injection period (an injection amount) of the fuel which is supplied from each of the injectors 115 are controlled with a high precision. Accordingly, it is possible to reduce a nitrogen oxide (NOx) from the engine 70, and it is possible to reduce a noise vibration of the engine 70.

Figure 3:
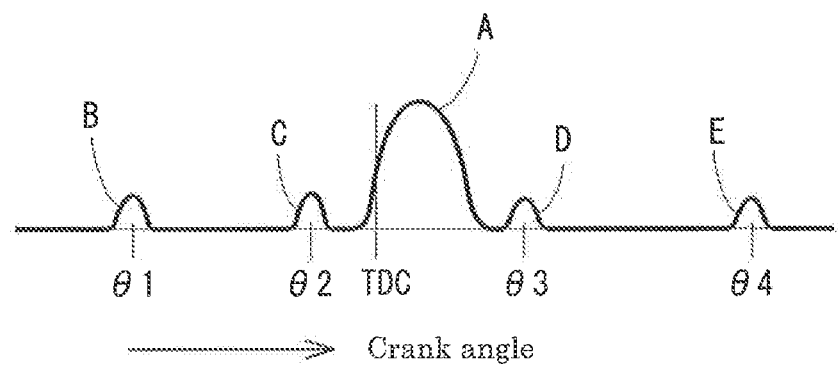
FIG. 3 is a view describing an injection timing of a fuel.

As shown in FIG. 3, the common rail system 117 is structured such as to execute a main injection A in the vicinity of a top dead center (TDC). Further, the common rail system 117 is structured such as to execute a small amount of pilot injection B for reducing the NOx and the noise at a moment of a crank angle θ1 which is about 60 degree before the top dead center, execute a pre injection C for reducing the noise at a moment of a crank angle θ2 which is just before the top dead center, and execute an after injection D and a post injection E for reducing a particulate matter (hereinafter, refer to as PM) and promoting a purification of the exhaust gas at a moment of crank angles θ3 and θ4 which are after the top dead center, in addition to the main injection A.

In this case, as shown in FIG. 1, the fuel supply pump 116 is connected to the fuel tank 118 via a fuel return pipe 129. A common rail return pipe 131 is connected to an end portion in a longitudinal direction of the cylindrical common rail 120 via a return pipe connector 130 which controls a pressure of the fuel within the common rail 120. In other words, a surplus fuel in the fuel supply pump 116 and a surplus fuel in the common rail 120 are recovered in the fuel tank 118 via the fuel return pipe 129 and the common rail return pipe 131.

To an exhaust pipe 77 which is connected to a downstream side of an exhaust gas in the exhaust manifold 71, there are connected an exhaust gas throttle device 82 for regulating an exhaust gas pressure of the engine 70, and a diesel particulate filter (hereinafter, refer to as DPF) 50 which corresponds to one example of the exhaust gas purification device. The exhaust gas discharged from each of the cylinders to the exhaust manifold 71 is discharged to an outside after being applied a purifying process via the exhaust pipe 77, the exhaust gas throttle device 82 and the DPF 50.

The DPF 50 is provided for collecting the PM or the like in the exhaust gas. The DPF 50 of the embodiment is structured such that a diesel oxidation catalyst 53, for example, a platinum or the like, and a soot filter 54 are arranged in series and accommodated in an approximately tubular filter case 52 within a casing 51 which is made of a heat resisting metal material. In the embodiment, the diesel oxidation catalyst 53 is arranged in an upstream side of the exhaust gas within the filter case 52, and the soot filter 54 is arranged in a downstream side of the exhaust gas. The soot filter 54 is formed as a honeycomb structure having a lot of cells which are sectioned by a porous (filterable) partition wall.

One side portion of the casing 51 is provided with an exhaust gas introduction port 55 which is communicated with the downstream side of the exhaust gas from the exhaust gas throttle device 82 among the exhaust pipe 77. One end portion of the casing 51 is occluded by a first bottom plate 56, and one end portion facing to the first bottom plate 56 among the filter case 52 is occluded by a second bottom plate 57. A heat insulating material 58 such as a glass wool is filled in an annular gap between the casing 51 and the filter case 52, and a gap between both the bottom plates 56 and 57, in such a manner as to surround a periphery of the diesel oxidation catalyst 53 and the soot filter 54. The other side portion of the casing 51 is occluded by two lid plates 59 and 60, and an approximately tubular exhaust gas discharge port 61 passes through both the lid plates 59 and 60. Further, a portion between both the lid plates 59 and 60 is a resonance chamber 63 which is communicated with an inner side of the filter case 52 via a plurality of communication pipes 62.

An exhaust gas introduction pipe 65 is inserted to the exhaust gas introduction port 55 which is formed in the one side portion of the casing 51. A leading end of the exhaust gas introduction pipe 65 protrudes to a side face in an opposite side to the exhaust gas introduction port 55 while cutting across the casing 51. A plurality of communication holes 66 which are open toward the filter case 52 are formed in an outer peripheral surface of the exhaust gas introduction pipe 65. A portion protruding to the side face in the opposite side to the exhaust gas introduction port 55 among the exhaust gas introduction pipe 65 is occluded by a lid body 67 which is detachably attached by screw thereto.

The DPF 50 is provided with a DPF temperature sensor 26 which detects a temperature of the exhaust gas within the DPF 50, as one example of detecting means. The DPF temperature sensor 26 of the embodiment is installed while passing through the casing 51 and the filter case 52, and a leading end of the DPF temperature sensor 26 is positioned between the diesel oxidation catalyst 53 and the soot filter 54.

Further, the DPF 50 is provided with a differential pressure sensor 68 which detects a clogged state of the soot filter 54, as one example of the detecting means. The differential pressure sensor 68 of the embodiment is structured such as to detect a pressure difference (a differential pressure) between upstream and downstream sides with respect to the soot filter 54 within the DPF 50. In this case, an upstream side exhaust gas pressure sensor 68a constructing the differential pressure sensor 68 is installed to the lid body 67 of the exhaust gas introduction pipe 65, and a downstream side exhaust gas pressure sensor 68b is installed between the soot filter 54 and the resonance chamber 63. It has been well known that a definite principle exists between the pressure difference between the upstream and downstream sides of the DPF 50, and a PM deposition amount within the DPF 50. In the embodiment, a renewing control (a DPF renewing control) of the soot filter 54 is executed by estimating the PM deposition amount within the DPF 50 from the pressure difference which is detected by the differential pressure sensor 68, and actuating the intake air throttle device 81 and the common rail 120 on the basis of the estimated result.

In this case, the clogged state of the soot filter 54 may be detected by an exhaust gas pressure sensor which detects the pressure in the upstream side of the soot filter 54 within the DPF 50, without being limited to the differential pressure sensor 68. In the case that the exhaust gas pressure sensor is employed, the clogged state of the soot filter 54 is determined by comparing a pressure (a reference pressure) in the upstream side of the soot filter 54 under a brand-new state in which the PM is not deposited up in the soot filter 54, with the current pressure which is detected by the exhaust gas pressure sensor.

In the structure mentioned above, the exhaust gas from the engine 5 enters into the exhaust gas introduction pipe 65 via the exhaust gas introduction port 55, is spouted out into the filter case 52 from each of the communication holes 66 which are formed in the exhaust gas introduction pipe 65, is dispersed into a wide region within the filter case 52, and thereafter passes through the diesel oxidation catalyst 53 and the soot filter 54 in this order so as to be purified. The PM in the exhaust gas can not pass through the porous partition wall between the cells in the soot filter 54 at this stage, and is collected. Thereafter, the exhaust gas passing through the diesel oxidation catalyst 53 and the soot filter 54 is discharged from the exhaust gas discharge port 61.

If the temperature of the exhaust gas exceeds a renewal boundary temperature (for example, about 300° C.) at a time when the exhaust gas passes through the diesel oxidation catalyst 53 and the soot filter 54, NO (nitrogen monoxide) in the exhaust gas is oxidized into an unstable $NO_2$ (nitrogen dioxide) on the basis of an action of the diesel oxidation catalyst 53. Further, a PM collecting capacity of the soot filter 54 is recovered (the DPF 50 is renewed) by oxidation removing the PM which is deposited in the soot filter 54, with O (oxygen) that $NO_2$ discharges at a time of returning to NO.

(2) Structure Relevant to Control of Engine

Figure 4:
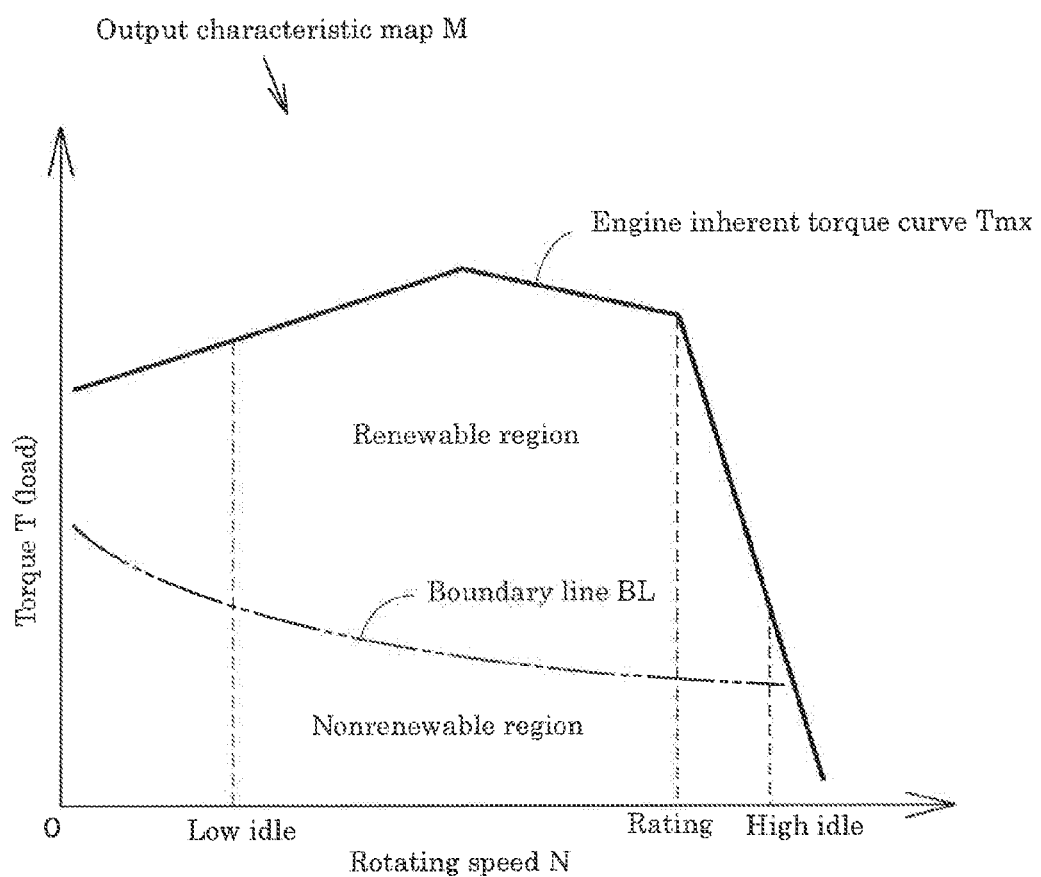
FIG. 4 is an explanatory view of an output characteristic map.

Next, a description will be given of a structure which is relevant to a control of the engine 70 with reference to FIG. 1, FIG. 3 and FIG. 4. As shown in FIG. 1, there is provided with an ECU 11 which actuates the fuel injection valve 119 in each of the cylinders in the engine 70. The ECU 11 has ROM 32 which previously stores various data in a fixed manner, EEPROM 33 which stores control programs and the various data in a rewritable manner, RAM 34 which temporarily stores the control programs and the various data, a timer 35 for measuring a time, and an input and output interface and the like, in addition to CPU 31 which executes various arithmetic processes and controls, and is arranged in the engine 70 or in the vicinity thereof.

To an input side of the ECU 11, there are connected at least a rail pressure sensor 12 which detects the fuel pressure within the common rail 120, an electromagnetic clutch 13 which rotates or stops the fuel pump 116, an engine speed sensor 14 which detects a rotating speed of the engine 70 (a position of a can shaft of a crank shaft 74), an injection setting device 15 which detects and sets a fuel injection frequency (a frequency in one stroke fuel injection period) of the injector 115, a throttle position sensor 16 which detects an operating position of an accelerator operating device (not shown), an intake air temperature sensor 17 which detects a temperature of the intake air in an intake air route, an exhaust gas temperature sensor 18 which detects a temperature of the exhaust gas in an exhaust gas route, a cooling water temperature sensor 19 which detects a temperature of a cooling water in the engine 70, a fuel temperature sensor 20 which detects a temperature of the fuel within the common rail 120, an emergency switch 21 serving as renewal admittance input means which selects and operates whether an emergency renewing mode mentioned later can be executed, the differential pressure sensor 68 (the upstream side exhaust gas pressure sensor 68a and the downstream side exhaust gas pressure sensor 68b), a DPF temperature sensor 26 which detects a temperature of the exhaust gas within the DPF 50, a renewal inhibition button 27 serving as renewal inhibition input means which inhibits a renewing motion of the DPF 50, and parking brake detecting means 30 which detects an on-off state of parking brake operating means 29 (whether the parking brake operating means 29 is in the braked state) which maintains and operates the working machine in a braked state.

Each of electromagnetic solenoids of the fuel injection valves 119 for at least four cylinders is connected to an output side of the ECU 11. In other words, it is structured such that the high-pressure fuel stored in the common rail 120 is injected from the fuel injection valve 119 separately at a plurality of times in one stroke while controlling a fuel injection pressure, an injection timing and an injection period, thereby suppressing the nitrogen oxide (NOx) from being generated, executing a complete combustion in which the generation of the PM and a carbon dioxide is reduced, and improving a fuel consumption.

Figure 5:
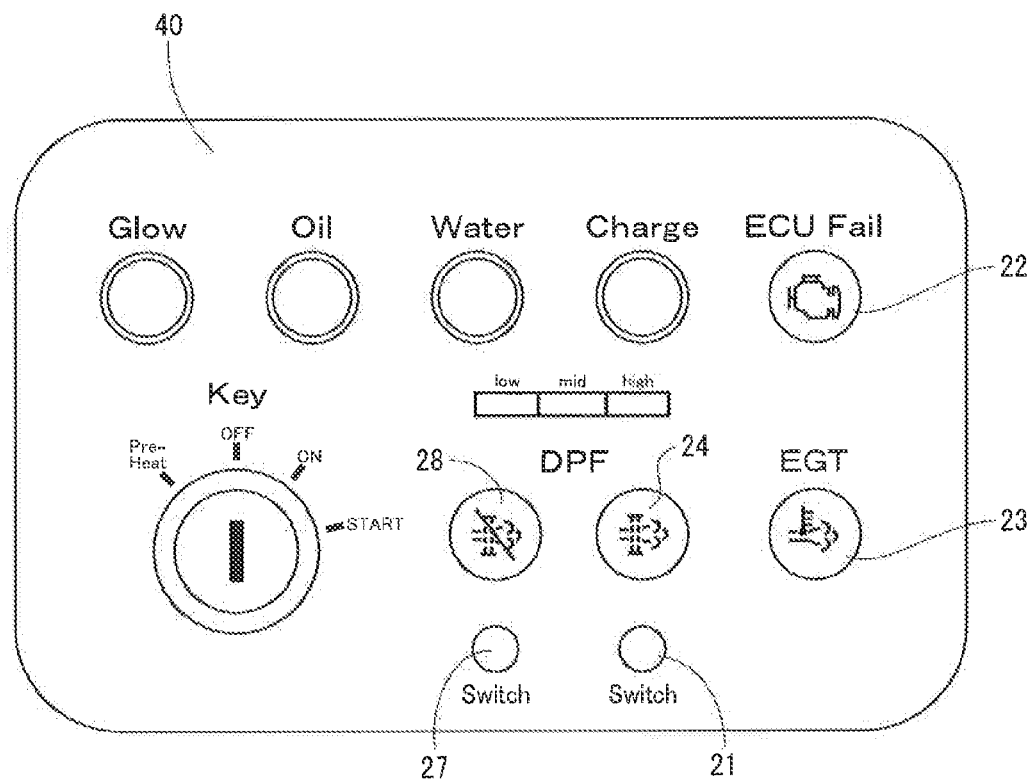
FIG. 5 is an explanatory view of an instrument panel.

Further, to an output side of the ECU 11, there are connected the intake air throttle device 81 for adjusting an intake air pressure (an intake air amount) of the engine 70, the exhaust gas throttle device 82 for adjusting an exhaust gas pressure of the engine 70, an ECU failure lamp 22 which gives a warning and informs of a failure of the ECU 11, an exhaust gas temperature warning lamp 23 serving as abnormally high temperature informing means which informs of abnormally high temperature of the exhaust gas within the DPF 50, a renewal lamp 24 which turns on with a renewing motion of the DPF 50, and a renewal inhibition lamp 28 serving as renewal inhibition informing means which is actuated during a pushing operation of the renewal inhibition button 27 (an inhibiting operation). Data relating to blinking of each of the lamps 22 to 24 and 28 is previously stored in the EEPROM 33 of the ECU 11. Though details will be mentioned later, the renewal lamp 24 constructs a single display device serving as renewal advance notifying means which is actuated if the clogged state of the DPF 50 becomes equal to or more than a prescribed level, and renewal informing means which informs of the matter that the DPF 50 is under renewing motion. In this case, as shown in FIG. 5, the emergency switch 21, the renewal inhibition button 27 and each of the lamps 22 to 24 and 28 are provided in an instrument panel 40 which exists in a working machine to which the engine 70 is mounted.

The emergency switch 21 belongs to an alternate motion type. In other words, the emergency switch 21 is a lock type push switch which is locked at a push-down position by one push-down motion, and is returned to the original position by one more push-down motion. If the emergency switch 21 is pushed down in the case that the clogged state of the DPF 50 is not improved even by executing a reset renewing mode mentioned later, the mode can be changed to an emergency renewing mode mentioned later. The renewal inhibition button 27 belongs to a momentary motion type. In other words, the renewal inhibition button 27 is a non-lock type push switch which emits one ON pulse signal by one push-down motion. While the operator pushes down the renewal inhibition button 27a current drive state in the engine 70 is inhibited and the execution of the automatic auxiliary renewing mode and the reset renewing mode is inhibited. While the operator pushes down the renewal inhibition button 27, a forced drive of the engine 70 and a post injection such that the temperature of the exhaust gas rises are prevented.

An output characteristic map M (refer to FIG. 3) indicating a relationship between a rotating speed N and a torque T (a load) of the engine 70 is previously stored in the EEPROM 33 of the ECU 11. The output characteristic map M is determined by an experiment or the like. In the output characteristic map M shown in FIG. 3, the rotating speed N is employed as a transverse axis, and the torque T is employed as a vertical axis. The output characteristic map M is a region which is surrounded by a solid line Tmx drawn convex upward. The solid line Tmx is a maximum torque line which indicates a maximum torque with respect to each of the rotating speed N. In this case, if the type of the engine 70 is the same, the output characteristic maps M stored in the ECU 11 are identical (common). As shown in FIG. 3, the output characteristic map M is segmented up and down by a boundary line BL which expresses a relationship between the rotating speed N and the torque T in the case that the temperature of the exhaust gas is a renewal boundary temperature (about 300° C.). A region in an upper side with respect to the boundary line BL is a renewable region in which the PM deposited in the soot filter 54 can be oxidized and removed (in which an oxidizing action of the oxidation catalyst 53 works), and a region in a lower side is a nonrenewable region in which the PM is deposited in the soot filter 54 without being oxidized and removed.

The ECU 11 basically executes a fuel injection control which computes the torque T on the basis of the output characteristic map M, the rotating speed N which is detected by the engine speed sensor 14, and the throttle position which is detected by the throttle position sensor 16 so as to determine a target fuel injection amount, and actuates the common rail system 117 on the basis of the result of computation. In this case, the fuel injection amount is adjusted by adjusting a valve open period of each of the fuel injection valves 119, and changing an injection period into each of the injectors 115.

(3) Aspect of DPF Renewing Control

Next, a description will be given of one example of the renewing control of the DPF 50 by the ECU 11 with reference to flow charts in FIG. 6 to FIG. 8. The control mode of the engine 70 (the control type relating to the renewal of the DPF 50) includes at least a normal drive mode which carries out a road travel and various works, an automatic auxiliary renewing mode which automatically raises the temperature of the exhaust gas when clogged state of the DPF 50 becomes equal to or more than a prescribed level, a reset renewing mode (which may be called also as a forced renewing mode) which supplies the fuel into the DPF 50 by a post injection E, an emergency renewing mode which maintains a rotating speed N of the engine 70 at a high idle rotating speed as well as supplying the fuel into the DPF 50 by the post injection E, and a limp home mode which sets the engine 70 to a minimum drive state (makes the working machine secure a minimum travel function).

In the automatic auxiliary renewing mode, an intake air amount and an exhaust gas amount are limited by closing at least one of the intake air throttle device 81 and the exhaust gas throttle device 82 to a predetermined opening degree, on the basis of the detected information of the differential pressure sensor 68. Accordingly, since the load of the engine 70 is increased, in conjunction with this, the output of the engine 70 is increased and the temperature of the exhaust gas from the engine 70 is raised. As a result, it is possible to burn and remove the PM within the DPF 50 (the soot filter 54).

The reset renewing mode (the forced renewing mode) is executed in the case that the clogged state of the DPF 50 is not improved (the PM remains) even by executing the automatic auxiliary renewing mode, and the case that an accumulated drive time Te of the engine 70 exceeds a set time T0 (for example, about 100 hours). In the reset renewing mode, the temperature of the exhaust gas within the DPF 50 is raised (about 560° C.), by supplying the fuel into the DPF 50 by the post injection E, and burning the fuel by the diesel oxidation catalyst 53. As a result, it is possible to forcibly burn and remove the PM within the DPF 50 (the soot filter 54).

The emergency renewing mode is executed in the case that the clogged state of the DPF 50 is not improved even by executing the reset renewing mode. In the emergency renewing mode, the temperature of the exhaust gas from the engine 70 is raised by maintaining the rotating speed N of the engine 70 at a high idle rotating speed (a maximum rotating speed) in addition to the control aspect of the reset renewing mode mentioned above (the execution of the post injection E), and the temperature of the exhaust gas is raised by the post injection E within the DPF 50 (about 600° C.). As a result, it is possible to forcibly burn and remove the PM within the DPF 50 (the soot filter 54) under a more preferable condition than the reset renewing mode.

The limp home mode is executed in the case that the clogged state of the DPF 50 is not improved even by executing the emergency renewing mode and the PM is excessively deposited (possibility of the PM runaway combustion is high), and the case that the runaway combustion of the PM is generated within the DPF 50. In the limp home mode, the engine 70 is held to a minimum drive state by restricting an upper limit of the output (the rotating speed N and the torque T) of the engine 70, and a drivable time of the engine 70. As a result, it is possible to get out the working machine, for example, from a work area or move it to a dealership and a service center. In other words, it is possible to make the working machine secure the minimum traveling function.

As is known from the description relating to each of the modes mentioned above, for example, the engine 70, the intake air throttle device 81, the exhaust gas throttle device 82 and the common rail system 117 are the members which involved in the renewing motion of the DPF 50. These elements 70, 81, 82 and 117 construct the renewing device for burning and removing the PM within the DPF 50.

Figure 6:
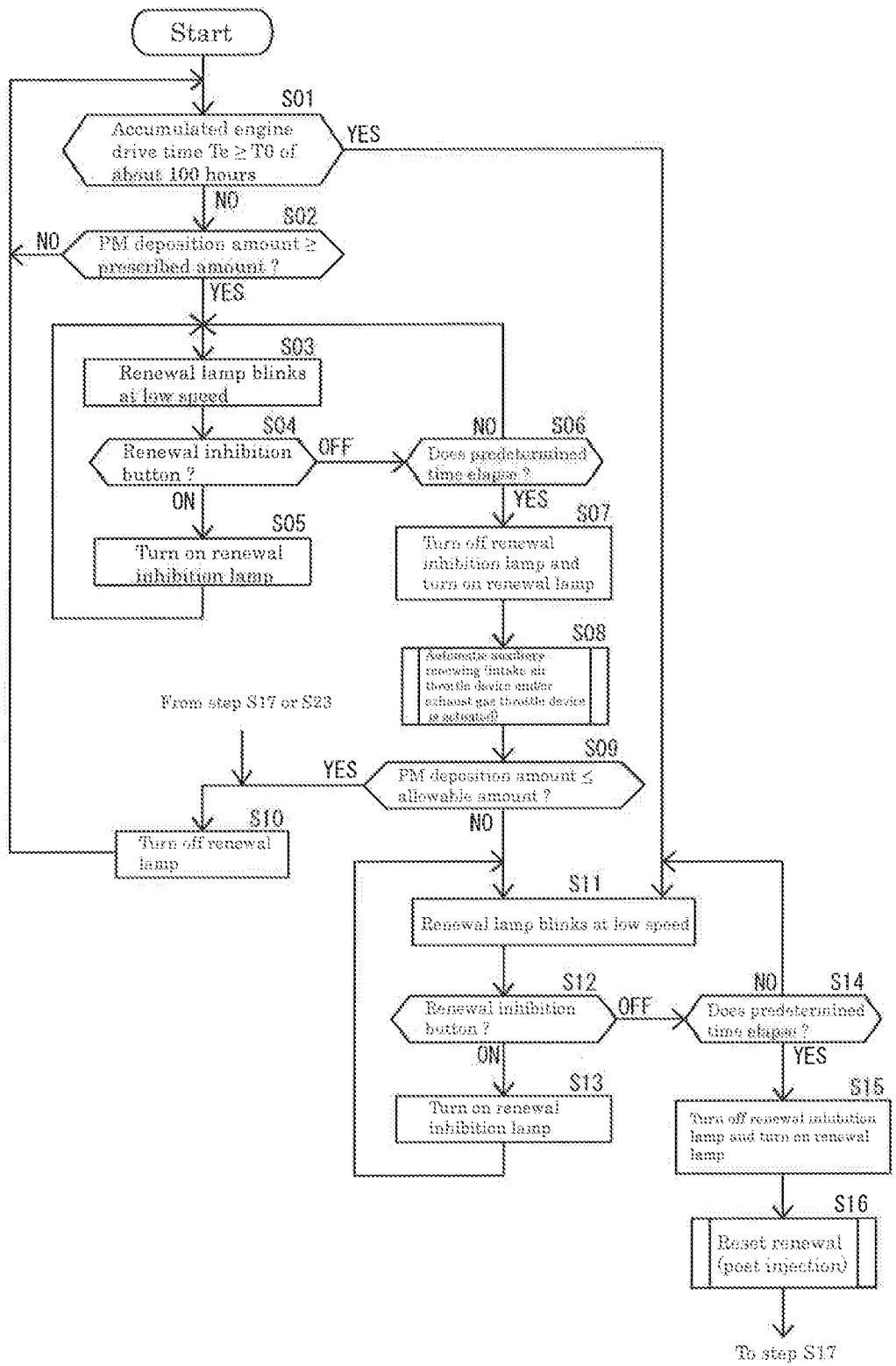
FIG. 6 is a first half portion of a flow chart showing a flow of a DPF renewing control.
Figure 7:
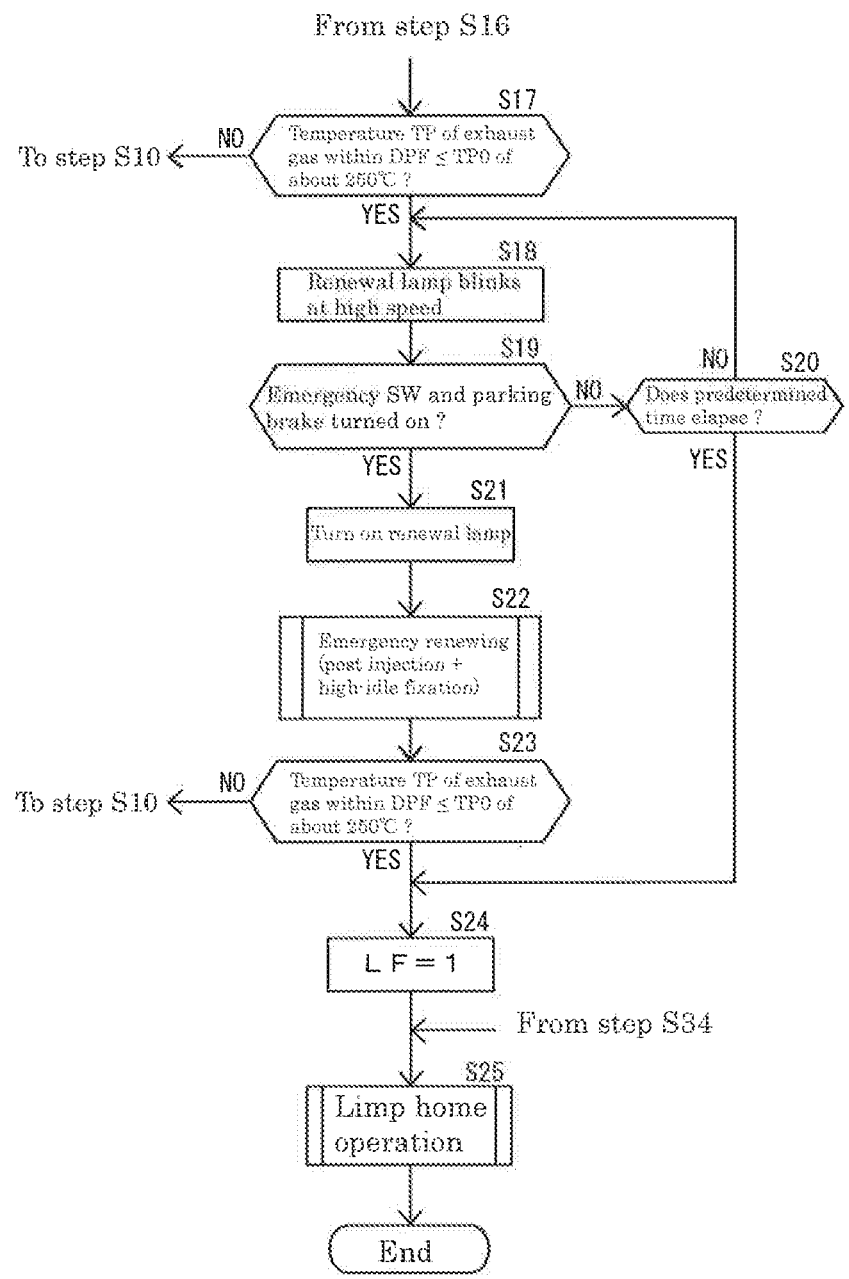
FIG. 7 is a second half portion of the flow chart showing the flow of the DPF renewing control.
Figure 8:
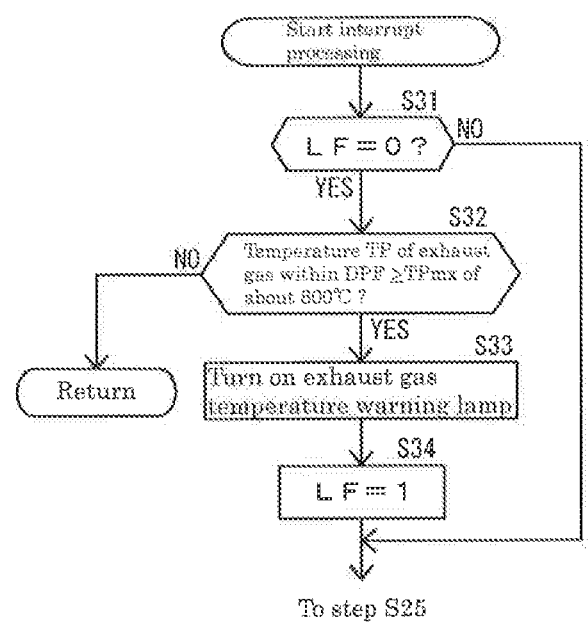
FIG. 8 is a flow chart showing an interrupt processing.

As shown in FIG. 6 to FIG. 8, each of the modes is executed on the basis of a command of the ECU 11. In other words, an algorithm shown by the flow charts in FIG. 6 to FIG. 8 is stored in the EEPROM 33. Further, each of the modes mentioned above is executed by calling the algorithm to the RAM 34 and processing in the CPU 31. Roughly speaking, steps in S01 to S06 shown in FIG. 6 correspond to the normal drive mode, and a step in S08 corresponds to the automatic auxiliary renewing mode. A step in S16 shown in FIG. 6 corresponds to the reset renewing mode, and a step in S22 shown in FIG. 7 corresponds to the emergency renewing mode. Further, a step in S26 shown in FIG. 7 corresponds to the limp home mode.

As shown by the flow charts in FIG. 6 and FIG. 7, in the renewing control of the DPF 50, firstly, it is determined whether an accumulated drive time Te of the engine 70 is equal to or more than a set time T0 (S01). The normal drive mode is executed in this stage. The set time T0 of the embodiment is set, for example, to about 100 hours. In this case, the accumulated drive time Te of the engine 70 is measured by using a time information of a timer 35 in the ECU 11 while the engine 70 is driven, and is stored and accumulated in the EEPROM 33.

If the accumulated drive time Te is equal to or more than the set time T0 (S01: YES), the step goes to a step S11 mentioned later. If the accumulated drive time Te is less than the set time T0 (S01: NO), a PM deposition amount within the DPF 50 is next estimated on the basis of the detected result by the differential pressure sensor 68, and it is determined whether the estimated result is equal to or more than a prescribed amount (a prescribed level) (S02). In the case that it is judged that the PM deposition amount is less than the prescribed amount (S02: NO), the step goes back to the step S01 and the normal drive mode is proceeded. The prescribed amount of the embodiment is set, for example, to 8 g/l. In the case that it is judged that the PM deposition amount is equal to or more than the prescribed amount (S02: NO), the measurement on the basis of the time information of the timer 35 is started so as to make the renewal lamp 24 blink at a low speed (S03) and the execution of the renewing motion of the DPF 50 (the automatic auxiliary renewing mode) is advance notified to the operator. In this case, a blinking frequency of the renewal lamp 24 is set, for example, to 1 Hz.

Next, it is determined whether the renewal inhibition button 27 is under the push-down operation (the inhibiting operation) (S04), if it is under the push-down operation (S04: ON), the renewal inhibition lamp 28 is turned on (S05), and thereafter the step goes back to the step S03. Accordingly, in the steps in S03 to S05, the control mode of the engine 70 stays in the normal drive mode in spite of the matter that the PM deposition amount is equal to or more than the prescribed amount, and the current drive state in the engine 70 is maintained. In other words, the change to the automatic auxiliary renewing mode (which may be called as the renewing motion of the DPF 50, or the actuation of the renewing device) is inhibited. Further, while the renewal inhibition button 27 is pushed, the fact that the renewing motion of the DPF 50 (the automatic auxiliary renewing mode) is inhibited is visually appealed to the operator by turning on the renewal inhibition lamp 28, thereby securely calling the operator's attention.

In the step S04, if the renewal inhibition button 27 is not under the push operation (S04: OFF), it is determined whether a predetermined time (for example, 10 seconds) elapses after starting the low speed blinking of the renewal lamp 24 (S06). If the predetermined time does not elapse (S06: NO), the step goes back to the step S03 as it is. If the predetermined time elapses (S06: YES), the renewal lamp 24 which blinks at the low speed is turned on (S07) while turning off the renewal inhibition lamp 28, and thereafter the automatic auxiliary renewing mode is executed (S08).

If the renewal advance notification of the DPF 50 and the following renewal information of the DPF 50 (the fact that the renewing device is under actuation of the renewing device) are displayed by differentiating the blinking aspect of the renewal lamp 24 as mentioned above, the operator can previously assume the shock of the fluctuation of the torque T and the change of the engine 70 sound which are generated thereafter by the renewal advance notification of the PDF 50. Further, the operator can easily comprehend the change to the renewing motion of the DPF 50 by informing the renewal information of the DPF 50. Accordingly, it is possible to do away with the uncomfortable feeling of the operator which is caused by the renewing motion of the DPF 50. Further, since it is possible to recognize the renewal advance notification of the DPF 50 and the renewal information of the DPF 50 distinctly from each other only by the blinking aspect of the renewal lamp 24, it is easy to comprehend with or without the renewing motion of the DPF 50, in addition, it is not necessary to provide each of the renewal advance notifying means and the renewal informing means, and it is possible to contribute to a cost reduction of this kind of display device.

In the automatic auxiliary renewing mode, the temperature of the exhaust gas is raised by increasing the load of the engine 70 by the restriction of the intake air amount or the exhaust gas amount using at least one of the intake air throttle device 81 and the exhaust gas throttle device 82, as mentioned above, and increasing the output of the engine 70 in conjunction with this. As a result, the PM within the DPF 50 is burnt and removed, and the PM collecting capacity of the DPF 50 is recovered. The automatic auxiliary renewing mode of the embodiment is executed, for example, for about 20 minutes, and the opening degrees of the intake air throttle device 81 and the exhaust gas throttle device 82 are returned to the original state before narrowing them, after an elapse of the time.

After the execution of the automatic auxiliary renewing mode, the PM deposition amount within the DPF 50 is estimated again on the basis of the detected result by the differential pressure sensor 68, and it is determined whether the estimated result is equal to or less than an allowable amount (S09). In the case that it is judged that the PM deposition amount is equal to or less than the allowable amount (S09: YES), an end of the automatic auxiliary renewing mode is informed by turning off the renewal lamp 24 (S10), and the step goes back to the step S01 so as to execute the normal drive mode. The allowable amount of the embodiment is set, for example, to 4 g/l. In the case that it is judged that the PM deposition amount exceeds the allowable amount (S09: NO), there comes to a state in which the PM within the DPF 50 is not sufficiently removed (the clogged state is not improved) in spite of the execution of the automatic auxiliary renewing mode. Accordingly, the measurement on the basis of the time information of the timer 35 is started and the step makes the renewal lamp 24 blink at a low speed (S11) and the execution of the renewing motion of the DPF 50 is advance notified to the operator (the reset renewing mode). In this case, a blinking frequency of the renewal lamp 24 is set, for example, to 1 Hz, in the same manner as the case of the automatic auxiliary renewing mode.

Next, it is determined whether the renewal inhibition button 27 is under pushing operation (S12), and if it is under operation (S04: ON), the renewal inhibition lamp 28 is turned on (S13) and thereafter the step goes back to the step S11. Therefore, in the steps S11 to S13, the current drive state in the engine 70 is maintained in spite of the fact that the clogged state of the DPF 50 is not improved, and the change to the reset renewing mode is inhibited. Further, in this case, while the renewal inhibition button 27 is operated to be pushed, the fact that the renewing motion of the DPF 50 (the reset renewing mode) is inhibited is visually appealed to the operator by turning on the renewal inhibition lamp 28, thereby calling the operator's attention securely.

In the step S12, if the renewal inhibition button 27 is not under pushing operation (S12: OFF), it is determined whether a predetermined time (for example, 10 seconds) elapses after starting the blinking of the renewal lamp 24 at the low speed (S14). If the predetermined time does not elapse (S14: NO), the step goes back to the step S11 as it is. If the predetermined time elapses (S14: YES), the renewal inhibition lamp 28 is turned off, the renewal lamp 24 which blinks at the low speed is turned on (S15), and the reset renewing mode is executed (S16).

In the reset renewing mode, as mentioned above, the temperature of the exhaust gas within the DPF 50 is raised by supplying the fuel into the DPF 50 by the post injection E of the common rail system 117 and burning the fuel by the diesel oxidation catalyst 53. As a result, the PM within the DPF 50 is forcibly burnt and removed, and the PM collecting capacity of the DPF 50 is recovered. The reset renewing mode of the embodiment is executed, for example, for about 30 minutes, and the common rail system 117 does not carry out the post injection E after the elapse of the time. In this case, if the reset renewing mode is executed, the accumulated drive time Te of the engine 70 is reset, and is newly measured by using the time information of the timer 35.

After the execution of the reset renewing mode, it is determined whether the temperature TP of the exhaust gas within the DPF 50 which is detected by the DPF temperature sensor 26 is equal to or less than a previously set lower limit temperature TP0 (S17). The lower limit temperature TP0 is a temperature lower than the renewal boundary temperature is employed (for example, about 300° C.). In other words, as the lower limit temperature TP0, nonrenewable temperature at which the PM is deposited in the soot filter 54 without being oxidized and removed is employed. The lower limit temperature TP0 of the embodiment is set, for example, to about 250° C. If the temperature TP of the exhaust gas within the DPF 50 exceeds the lower limit temperature TP0 (S17: NO), the step goes to the step S10 the renewal lamp 24 is turned off, and the end of the reset renewing mode is informed. Further, the step goes back to the step S01 so as to execute the normal drive mode.

If the temperature TP of the exhaust gas within the DPF 50 is equal to or less than the lower limit temperature TP0 (S17: YES), there comes to a state in which the temperature of the exhaust gas is not raised and the PM within the DPF 50 is not removed (the clogged state is not improved) in spite of the execution of the reset renewing mode. Accordingly, the renewal lamp 24 blinks at a high speed (S18), and the operator of the execution of the renewing motion of the DPF 50 (the emergency renewing mode) is advance notified. In this case, a blinking frequency of the renewal lamp 24 is set to a frequency which is different from the cases of the automatic auxiliary renewing mode and the reset renewing mode. For example, the blinking frequency of the renewal lamp 24 for advance notifying the emergency renewing mode is set to 2 Hz.

Next, it is determined whether both of the emergency switch 21 and the parking brake operating means 29 are under operation state (S19). This intends to inhibit the change to the emergency renewing mode until the operator intentionally stops the traveling and the various works of the working machine, in order to widely enhance the rotating speed N of the engine 70 in the emergency renewing mode. If both of the emergency switch 21 and the parking brake operating means 29 are in operation state (S19: YES), the renewal lamp 24 blinking at the high speed is turned on (S21) and thereafter executes the emergency renewing mode (S22). In this case, only the on-off state of the emergency switch 21 may be determined, or only the on-off state of the parking brake operating means 29 may be determined. In this case, on the basis of the operation of bath the emergency switch 21 and the parking brake operating means 29, more effect can be achieved as an interlock structure (a glitch preventing structure) with respect to the execution of the emergency renewing mode.

In the emergency renewing mode, as mentioned above, the fuel is supplied into the DPF 50 by the post injection E of the common rail system 117, and the fuel is burnt by the diesel oxidation catalyst 53. In addition, the injection state of the fuel to each of the cylinders is adjusted by an electronic control of the common rail system 117, and the rotating speed N of the engine 70 is maintained at a high idle rotating speed (a maximum rotating speed). Accordingly, after raising the temperature of the exhaust gas from the engine 70, the temperature of the exhaust gas is raised within the DPF 50 by the post injection E (about (600° C.). As a result, it is possible to forcibly burn and remove the PM within the DPF 50 under a further more preferable condition than the reset renewing mode, and it is possible to recover the PM collecting capacity of the DPF 50. The emergency renewing mode of the embodiment is executed, for example, for about 15 minutes, and after the elapse of the time, the common rail system 117 does not carry out the post injection E, and the injection state of the fuel to each of the cylinders is adjusted so as to return the rotating speed N of the engine 70 to the original rotating speed before the high idle fixation.

After the execution of the emergency renewing mode, it is determined whether the temperature TP of the exhaust gas within the DPF 50 which is detected by the DPF temperature sensor 26 is equal to or less than the lower limit temperature TP0 (S23). If the temperature TP of the exhaust gas within the DPF 50 exceeds the lower limit temperature TP0 (S23: NO), the step goes to the step S10, the renewal lamp 24 is turned off, and the end of the emergency renewing mode is informed. Further, the step goes back to the step S01 so as to execute the normal drive mode.

If the temperature TP of the exhaust gas within the DPF 50 is equal to or less than the lower limit temperature TP0 (S23: YES), there comes to the PM excessively deposited state in which the exhaust gas temperature does not rise and the clogged state of the DPF 50 is not improved, in spite of the execution of the reset renewing mode. In this case, since there is a possibility of the PM runaway combustion, after a limp home flag LF is set (LF=1, S24), the limp home mode is executed (S25). In the limp home mode, as mentioned above, the engine 70 is held in the minimum drive state by restricting upper limit values Nmx and Tmx of the output (the rotating speed N and the torque T) of the engine 70, and a drivable time Tmx of the engine 70. As a result, it is possible to secure a minimum traveling function in the working machine.

In this case, the limp home flag LF corresponds to the fact whether the limp home mode was executed in the past, and is set such that it is not reset until using an external tool (existing, for example, in a dealership or a service center) which is connected to the ECU 11 via a communication terminal line. Accordingly, it is set such that once the limp home mode is executed, the mode can not be returned to the other mode until inspecting and maintaining in the dealership or the service center so as to reset the limp home flag.

Further, the limp home mode is set such that the rotating speed N and the torque T of the engine 70 are lowered little by little to the upper limit threshold values Nmx and Tmx in the case that the current rotating speed N and torque T in the engine 70 are greater than the upper limit threshold values Nmx and Tmx. Accordingly, in the case of the change to the limp home mode, it is possible to prevent the rotating speed N and the torque T from being changed (lowered) rapidly so as to do away with the uncomfortable feeling of the operator at the time of execution of the limp home mode, and it is possible to avoid a problem that the operator can not deal with it so as to cause the engine stall.

In this case, in the step S19, if both of the emergency switch 21 and the parking brake operating means 29 are not in the on state (S19: NO), it is determined whether a predetermined time (for example, 30 minutes) elapses after the start of the high-speed blinking of the renewal lamp 24 (S20). If the predetermined time does not elapse (S20: NO), the step goes back to the step S18 as it is. If the predetermined time elapses (S20: YES), there is understood that the DPF 50 is in the PM excessively deposited state because the emergency renewing mode is failed in spite of the fact that the emergency renewing mode should be executed. Accordingly, after the limp home flag LF is set (LF=1, S24), the limp home mode is executed (S25).

In this case, the ECU 11 of the embodiment is structured such that an interrupt processing shown in FIG. 8 is executed under execution of the renewing control of the DPF 50. In the interrupt processing, the detected result of the DPF temperature sensor 26 is checked at appropriate time intervals. In this case, as shown by a flow chart in FIG. 8, it is determined whether the limp home flag LF is reset (S31). If the limp home flag LF is in the set state (S31: NO), the step goes to the step S25 and the limp home mode is executed because it is not possible to return to the other mode from the limp home mode.

If the limp home flag LF is in the reset state (S31: YES), it is determined whether the temperature TP of the exhaust gas within the DPF 50 which is detected by the DPF temperature sensor 26 exceeds a previously set abnormal temperature TPex (S32) in the case that the temperature TP exceeds the abnormal temperature TPex (S32: YES) the exhaust gas temperature warning lamp 23 serving as the abnormally high temperature informing means is turned on (S33), and thereafter sets the limp home flag LF is set (S34). Further, the step goes to the step S25 so as to execute the limp home mode. The abnormal temperature TPex of the embodiment is set to, for example, about 800° C. The state in which the temperature TP of the exhaust gas within the DPF 50 exceeds the abnormal temperature TPex can be understood as the runaway combustion of the excessively deposited PM. In this case, there is a risk that the DPF 50 is broken (melt-away), and an excessive emission (air contaminant) is discharged. Accordingly, the step is quickly changed to the limp home mode.

In this case, it is possible to employ an interrupt processing which determines on the basis of the detected result of the differential pressure sensor 68 whether an abnormally differential pressure is generated and changes to the limp home mode in the case that the abnormally differential pressure is generated. The case that the abnormally differential pressure is generated can be understood as the PM excessively deposited state in which the possibility of the PM runaway combustion is concerned. Accordingly, in this case, it is desirable to quickly change to the limp home mode.

(4) First Summary

As is apparent from the above description and FIG. 1, FIG. 5 and FIG. 6, since the exhaust gas purification device 50 which is arranged in the exhaust gas route 77 of the engine 70, the renewing devices 70, 81, 82 and 117 for burning and removing the particulate matter within the exhaust gas purification device 50, the renewal advance notifying means 24 which is actuated in the case that the clogged state of the exhaust gas purification device 50 becomes equal to or more than the prescribed level, and the renewal informing means 24 which informs of the matter that the renewing devices 70, 81, 82 and 117 are under operation provided, and it is structured such that the renewal advance notifying means 24 is actuated before actuating the renewing devices 70, 81, 82 and 117, the operator can previously assume the shock of fluctuation of the torque T and the change of sound of the engine 70 which are generated thereafter, by the renewal advance notification. Further, by the renewal information, the operator can easily comprehend the change to the renewing motion of the exhaust gas purification device 50. Therefore, it is possible to achieve the effect that the uncomfortable feeling of the operator caused by the renewing motion of the exhaust gas purification device 50 can be done away. For example, it is possible to compensate a defect in the renewing motion of the exhaust gas purification device 50 which may obstruct the careful work which the operator executes on the basis of the sound of the engine 70.

As is apparent from the above description and FIG. 1, FIG. 5 and FIG. 6, since the renewal advance notifying means 24 and the renewal informing means 24 are constructed by the single display device 24, and are structured such as to display the renewal advance notification and the renewal information on the basis of the different aspects, it is possible to recognize the renewal advance notification and the renewal information distinctly from each other by the different aspects despite using the single display device. Accordingly, it is possible to achieve an effect that the operator easily comprehends with or without the renewing motion of the exhaust gas purification device 50. In addition, it is not necessary to provide the renewal advance notifying means 24 and the renewal informing means 24 individually, and it is possible to contribute to a cost reduction of this kind of display device 24.

As is apparent from the above description and FIG. 1, FIG. 5 and FIG. 6, since the renewal inhibition input means 27 which inhibits the renewing motion of the exhaust gas purification device 50 is provided, and it is structured such as to prevent the renewing devices 70, 81, 82 and 117 from being actuated (inhibit the renewing motion of the exhaust gas purification device 50) under inhibiting operation of the renewal inhibition input means 27, regardless of the clogged state of the exhaust gas purification device 50, it is possible to inhibit the renewing motion of the exhaust gas purification device 50 on the basis of the intention of the operator depending on the state of the working machine to which the engine 70 is mounted. Accordingly, through the renewing control for recovering the particulate matter collecting capacity of the exhaust gas purification device 50 can be automatically executed, there can be achieved an effect to smoothly carry out the careful work which the operator executes on the basis of the sound of the engine 70. In other words, it is possible to do away with the defect in the renewing motion of the exhaust gas purification device 50 which may obstruct the careful work.

As is apparent from the above description and FIG. 1, FIG. 5 and FIG. 6, since the renewal inhibition informing means 28 which is actuated under inhibiting operation of the renewal inhibition input means 27 is provided, it is possible to visually appeal to the operator the fact that the renewing motion of the exhaust gas purification device 50 is inhibited, by the information of the renewal inhibition informing means 28, while the renewal inhibition input means 27 is operated to inhibit, and it is possible to securely call the operator's attention. There is an advantage that it is possible to easily confirm whether the renewal is under inhibition, by checking the state of the renewal inhibition informing means 28.

As is apparent from the above description and FIG. 1, FIG. 6 and FIG. 7, since the exhaust gas purification device 50 which is arranged in the exhaust gas route 77 of the common rail type engine 70, and the renewing devices 70, 81, 82 and 117 for burning and removing the particulate matter within the exhaust gas purification device 50 are provided, and it is structured such as to execute the emergency renewing mode which supplies the fuel into the exhaust gas purification device 50 by the post injection E and maintains the rotating speed N of the engine 70 at the predetermined value (the high-idle rotating speed), in the case that the clogged state of the exhaust gas purification device 50 is not improved even by executing the reset renewing mode which supplies the fuel into the exhaust gas purification device 50 by the post injection E, it is possible to prevent the particulate matter within the exhaust gas purification device 50 from increasing to the excessively deposited state which may cause the runaway combustion, and it is possible to inhibit the runaway combustion of the particulate matter from being generated within the exhaust gas purification device 50. Therefore, it is possible to prevent a malfunction of the exhaust gas purification device 50 and the engine 70 which is caused by the excessive deposition of the particulate matter.

As is apparent from the above description and FIG. 1 and FIG. 5 to FIG. 7, since the renewal advance notifying means 24 which is actuated in the case that the clogged state of the exhaust gas purification device 50 becomes equal to or more than the prescribed level, and the renewal admittance input means 221 which allows the actuation of the renewing devices 70, 81, 82 and 117 are provided, and it is structured such that the renewal advance notifying means 24 is actuated in the case that the clogged state of the exhaust gas purification device 50 is not improved even by executing the reset renewing mode, and the emergency renewing mode is executed in the case that the allowing operation of the renewal admittance input means 221 is carried out under operation of the renewal advance notifying means 24, the emergency renewing mode is not executed without intention of the operator. Accordingly, in the emergency renewing mode in which the rotating speed N of the engine 70 widely rises, the operator can previously assume the shock due to the fluctuation of the torque T and the change of the sound of the engine 70. Therefore, it is possible to avoid an unexpected occurrence, for example, a rapid acceleration of the working machine to which the engine is mounted.

As is apparent from the above description and FIG. 1 and FIG. 6 to FIG. 8, since the parking brake operating means 29 which maintains the working machine mounted with the engine 70 in the braked state is provided, and it is structured such that the emergency renewing mode is not executed regardless of the clogged state of the exhaust gas purification device 50 and the operating state of the renewal admittance input means 221, in the case that the braking operation of the parking brake operating means 29 is not carried out, it is possible to inhibit the mode from changing to the emergency renewing mode until the operator intentionally stops the traveling and the various works of the working machine. Accordingly, in the emergency renewing mode in which the rotating speed N of the engine 70 is widely increased, it is possible to securely avoid an unexpected occurrence, for example, a rapid acceleration of the working machine. In other words, a higher effect can be achieved, as an interlock structure (a glitch preventing structure) with respect to the execution of the emergency renewing mode.

As is apparent from the above description and FIG. 1 and FIG. 6 to FIG. 8, since it is structured such as to return to the normal drive mode in the case that the clogged state of the exhaust gas purification device 50 is improved after the execution of the emergency renewing mode, it is not necessary for the operator to carry out the returning operation, for example, for changing the mode. Therefore, it is possible to save the labor hour, and lighten the operation load of the operator.

As is apparent from the above description and FIG. 1, FIG. 7 and FIG. 8, since it is structured such as to execute the limp home mode which restricts the upper limit threshold values Nmx and Tmx of the rotating speed N and the torque T of the engine 70, and the drivable time of the engine 70 in the case that the temperature TP of the exhaust gas within the exhaust gas purification device 50 becomes equal to or more than the abnormal temperature TPex after the execution of the emergency renewing mode, the engine 70 is held in the minimum drive state by executing the limp home mode in a state in which the runaway combustion of the particulate matter seems to be generated within the exhaust gas purification device 50. In other words, it is possible to secure the minimum traveling function for the working machine to which the engine is mounted. Therefore, it is possible to get out the working machine, for example, from the work area or move the working machine to a dealership or a service center, and evacuate the working machine to the safety area while preventing breakage (melt-away) of the exhaust gas purification device 50 and an excessive emission discharge.

As is apparent from the above description and FIG. 1, FIG. 7 and FIG. 8, since it is structured such that the mode can not be changed to the other modes than the limp home mode after the execution of the limp home mode, even by restarting the engine 70, the exhaust gas purification device 50 is more likely to be damaged once the limp home mode is executed. It is necessary to carry out the inspection and maintenance, for example, in the dealership or the service center. Accordingly, there is an advantage that it is possible to avoid fear that the exhaust gas purification device 50 is used in the damaged state, and to prevent the excessive emission discharge.

As is apparent from the above description and FIG. 1, FIG. 7 and FIG. 8, since it is structured such that the rotating speed N and the torque T of the engine 70 are lowered little by little to the upper limit threshold values Nmx and Tmx in the case that the current rotating speed N and torque T in the engine 70 are larger than the upper limit threshold values Nmx and Tmx, under execution of the limp home mode, it is possible to prevent the rotating speed N and the torque T from being changed (lowered) in the case of the change to the limp home mode. Accordingly, there can be achieved an effect to do away with the uncomfortable feeling of the operator at the time of the execution of the limp home mode and to avoid the problem that the operator can not deal so as to cause the engine stall.

As is apparent from the above description and FIG. 1, FIG. 7 and FIG. 8, since the abnormally high temperature informing means 23 which is actuated in the case that the temperature TP of the exhaust gas within the exhaust gas purification device 50 is equal to or more than the abnormal temperature TPex is provided, it is possible to inform the operator of the exhaust gas temperature abnormality (the runaway combustion), by the information of the abnormally high temperature informing means 23, and it is possible to achieve the effect which is a help of preventing the damage such as the melt-away of the exhaust gas purification device 50 from being expanded.

As is apparent from the above description and FIG. 1 and FIG. 6, since the exhaust gas purification device 50 which is arranged in the exhaust gas route 77 of the common rail type engine 70, and at least one of the intake air throttle device 81 and the exhaust gas throttle device 82 which are arranged in the intake and exhaust systems 76 and 77 of the engine 70 are provided, and it is structured such as to execute the auxiliary renewing mode which raises the temperature of the exhaust gas from the engine 70 by actuating at least one of the intake air throttle device 81 and the exhaust gas throttle device 82 in the case that the clogged state of the exhaust gas purification device 50 becomes equal to or more than the prescribed level, and execute the forced renewing mode which supplies the fuel into the exhaust gas purification device 50 by the post injection E in the case that the clogged state of the exhaust gas purification device 50 is not improved even by executing the auxiliary renewing mode, the temperature of the exhaust gas from the engine 70 is raised by increasing the output of the engine 70, by the restriction of the intake air amount or the exhaust gas amount using at least one of the intake air throttle device 81 and the exhaust gas throttle device 82, in the case that the clogging is generated in the exhaust gas purification device 50 under normal operating condition. Further, in the case that the clogged state of the exhaust gas purification device 50 is not improved even by executing the auxiliary renewing mode, the temperature of the exhaust gas within the exhaust gas purification device 50 is raised by supplying the fuel into the exhaust gas purification device 50 by the post injection E so as to burn.

In other words, whereas the temperature of the exhaust gas from the engine 70 is raised in the auxiliary renewing mode, the temperature of the exhaust gas within the exhaust gas purification device 50 is locally raised in the forced renewing mode. Accordingly, it is possible to forcibly and efficiently burn and remove the particulate matter within the exhaust gas purification device 50 in the forced renewing mode, in comparison with the case of the auxiliary renewing mode. In addition, since the auxiliary renewing mode is executed in the case that the clogging is generated in the exhaust gas purification device 50 under normal operating condition, it is possible to lower an execution frequency of the forced renewing mode, that is, an execution frequency of the post injection E. Therefore, there is achieved an effect that it is possible to suppress a fuel consumption deterioration and to suppress a durability deterioration of the engine 70 caused by dilution of the engine oil.

As is apparent from the above description and FIG. 1 and FIG. 6, since the mode is changed to the forced renewing mode regardless of the clogged state of the exhaust gas purification device 50 when the accumulated drive time Te of the engine 70 is equal to or more than the previously set time T0, it is possible to lower the execution frequency of the forced renewing mode, that is, the execution frequency of the post injection E, in the same manner as the case of the first aspect. Accordingly, there is achieved the effect that it is possible to suppress the fuel consumption deterioration while suppressing the durability deterioration of the engine 70 caused by dilution of the engine oil. Further, since it is possible to reset the deviation of the accumulated deposition amount (the estimated amount) per the set time T0, by the execution of the forced renewing mode, for example, in the case that the deposition amount of the particulate matter is estimated by using the differential pressure within the exhaust gas purification device 50, there is an advantage that it is possible to secure a reliability of the control relating to the renewal of the exhaust gas purification device 50.

As is apparent from the above description and FIG. 1 and FIG. 6, since it is structured such as to reset the accumulated drive time Te of the engine 70 and newly start the measurement, after the execution of the forced renewing mode, it is not necessary for the operator to carry out the reset operation, for example, of the accumulated drive time Te, and there is achieved an effect that it is possible to save labor hour of operation of the operator and to smoothly execute the forced renewing mode per the set time T0.

(5) Second Embodiment

FIG. 9 to FIG. 13 show a second embodiment of the present invention. The second embodiment is different from the first embodiment in a point that a renewing switch 221 which selects whether the renewing motion of the DPF 50, is employed as the renewal admittance input means, in place of the emergency switch 21, and a point that the renewal inhibition button 27 and the renewal inhibition lamp 28 are omitted, however, basically has the same structure as the first embodiment. A description will be mainly given below of the different points from the first embodiment.

Figure 9:
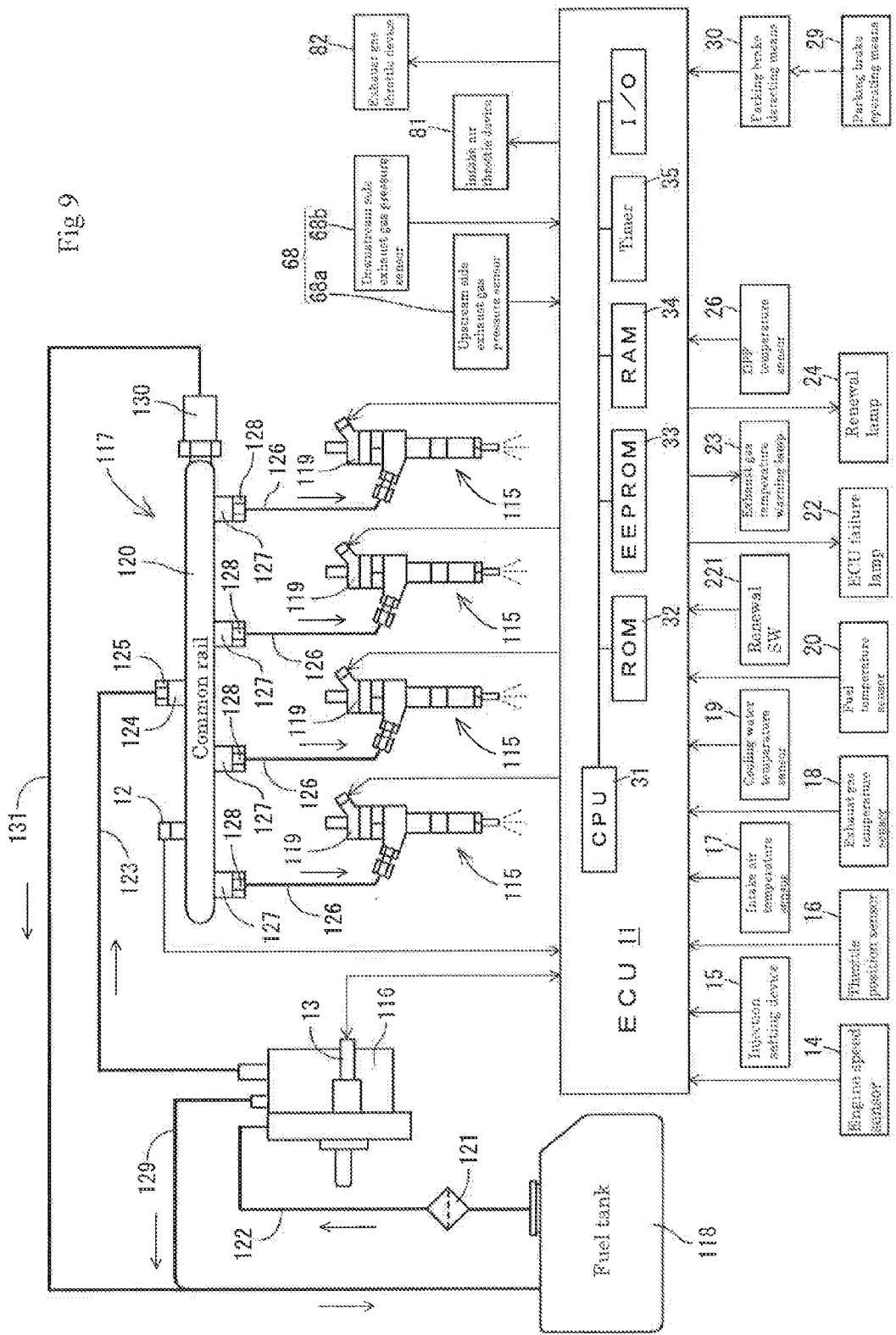
FIG. 9 is an explanatory view of a fuel system of an engine in a second embodiment.
Figure 10:
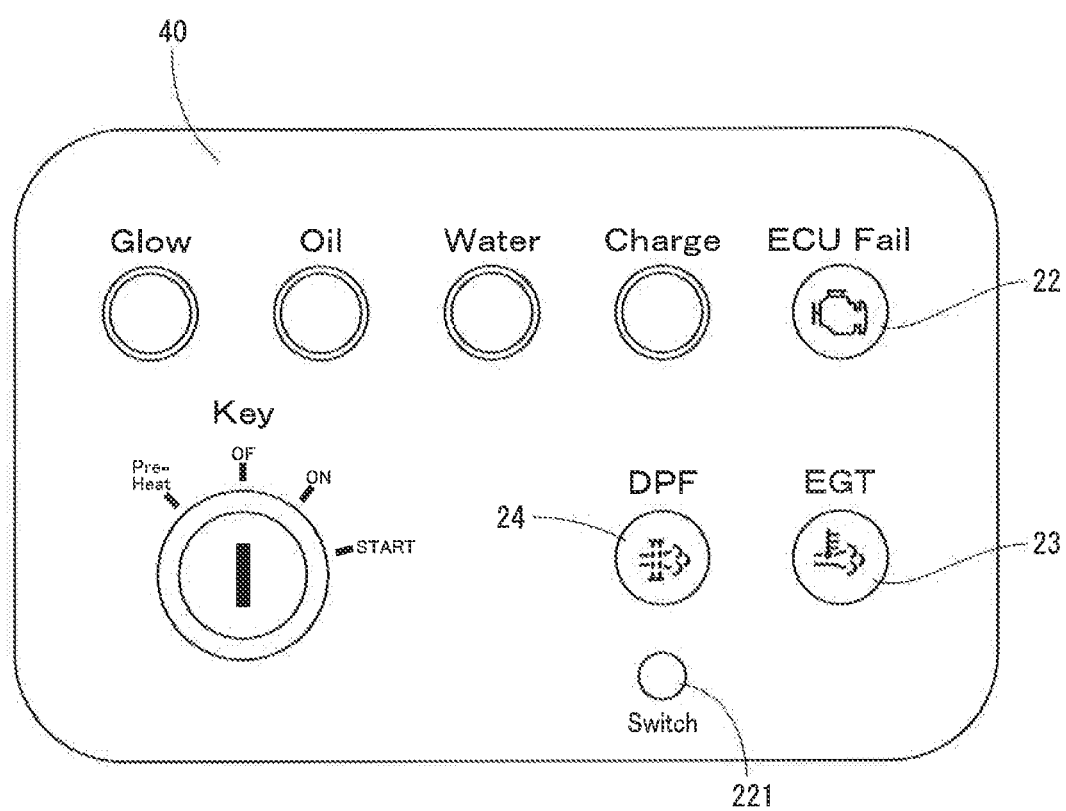
FIG. 10 is an explanatory view of an instrument panel.

The renewing switch 221 shown in FIG. 9 and FIG. 10 belongs to an alternate motion type. In other words, the renewing switch 221 is a lock type push switch which is locked at a push-down position by one push-down motion, and is returned to the original position by one more push-down motion. If the renewing switch 221 is locked at the pushdown position at the time of blinking of the renewal lamp 24 which informs of the fact that the clogged state of the DPF 50 reaches the prescribed level, the mode can be changed to each of modes mentioned later.

Next, a description will be given of one example of the renewing control of the DPF 50 by the ECU 11 with reference to flow charts in FIG. 11 to FIG. 13. In this case, in the second embodiment, a manual auxiliary renewing mode is employed as the control mode (the control type relating to the renewal of the DPF 50) of the engine 70, in place of the automatic auxiliary renewing mode. The manual auxiliary renewing mode is structured such as to raise the temperature of the exhaust gas in the case that the renewing switch 221 is pushed down, if the clogged state of the DPF 50 becomes equal to or more than the prescribed level. In the manual auxiliary renewing mode, the intake air amount and the exhaust gas amount are restricted by closing at least one of the intake air throttle device 81 and the exhaust gas throttle device 82 to a predetermined opening degree, on the basis of the detected information of the differential pressure sensor 68. Accordingly, since the load of the engine 70 is increased, the output of the engine 70 is increased in conjunction with this, and the temperature of the exhaust gas from the engine 70 is raised. As a result, it is possible to burn and remove the PM within the DPF 50 (the soot filter 54).

Figure 11:
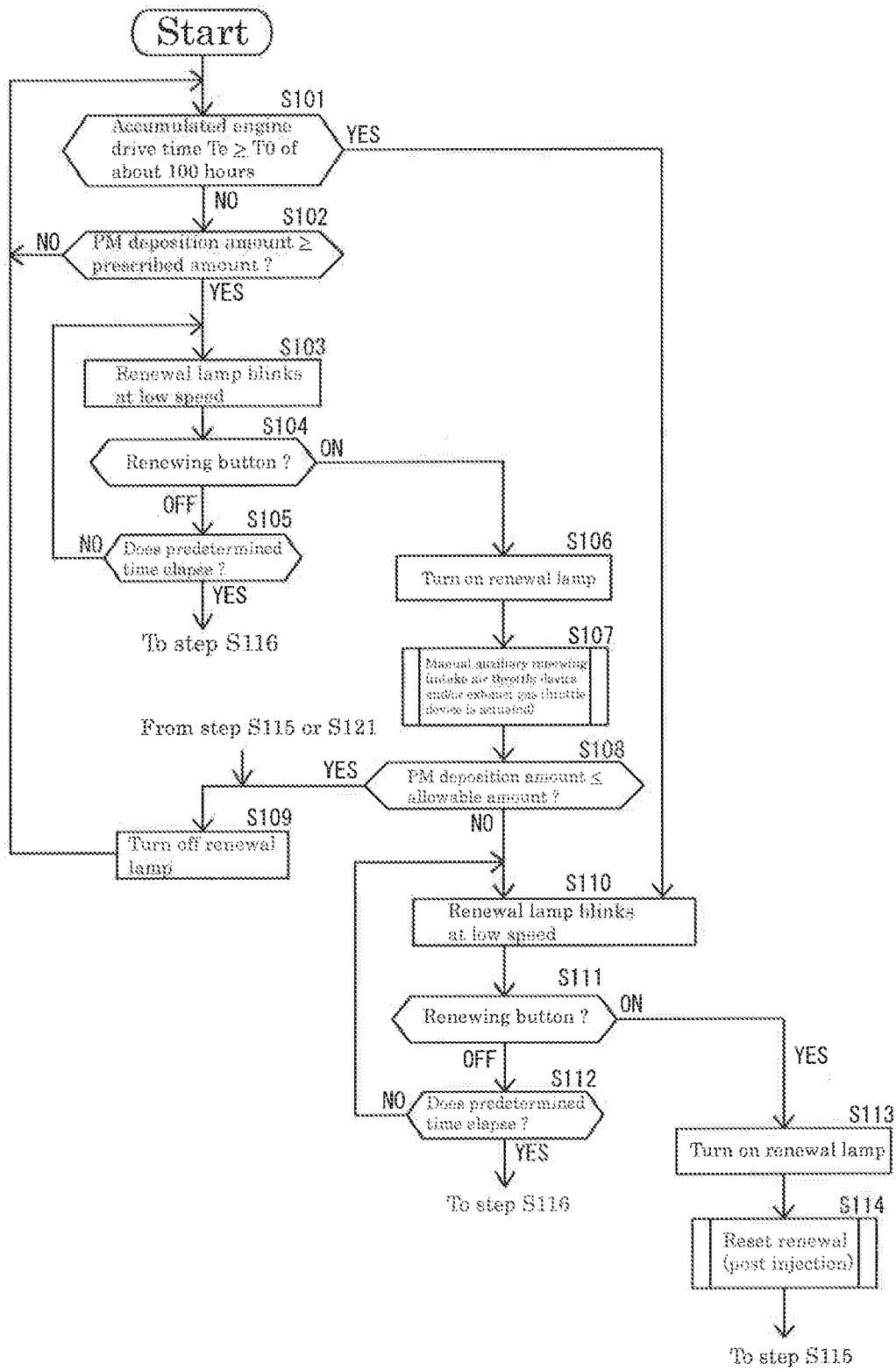
FIG. 11 is a first half portion of a flow chart showing a flow of a DPF renewing control.
Figure 12:
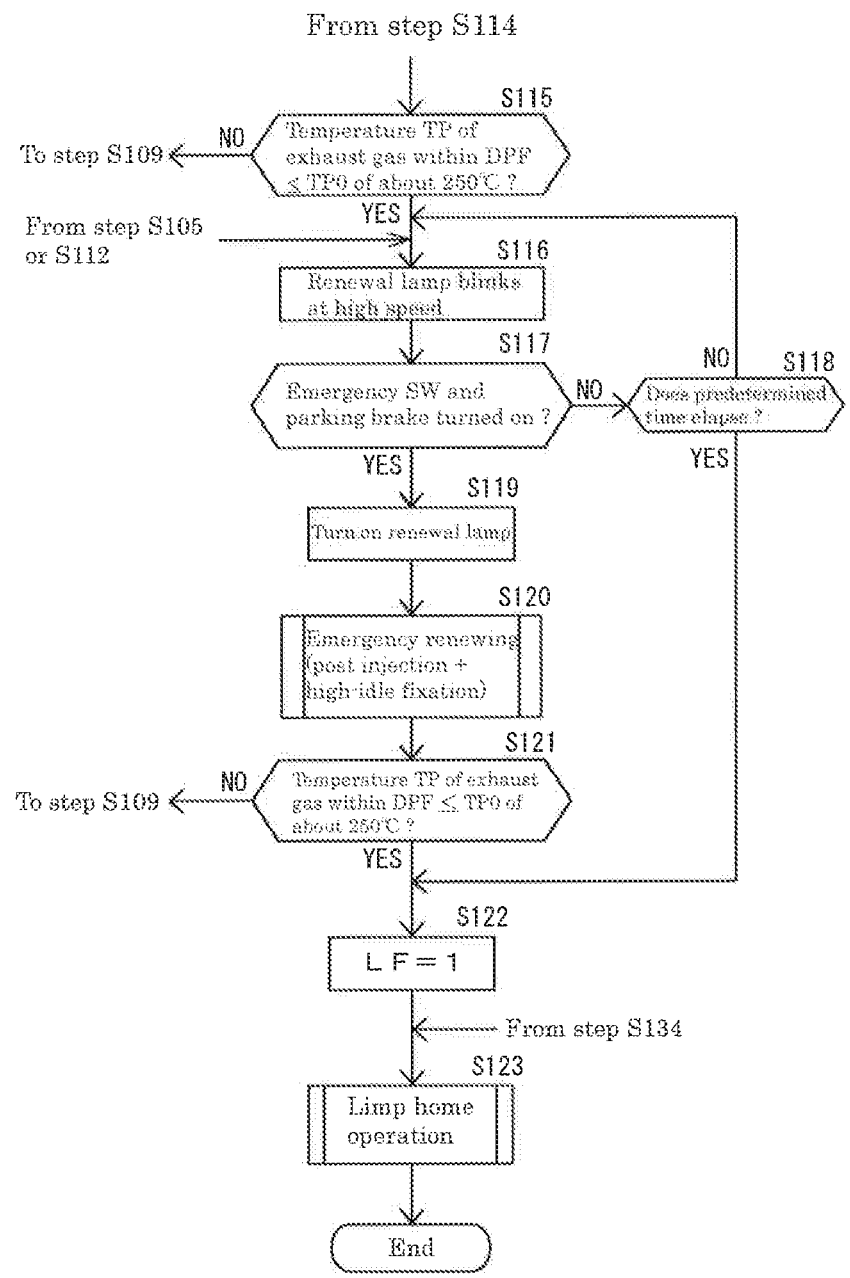
FIG. 12 is a second half portion of the flow chart showing the flow of the DPF renewing control.

In the second embodiment, roughly speaking, steps S101 to S106 shown in FIG. 11 correspond to the normal drive mode, and a step S107 corresponds to the manual auxiliary renewing mode. A step S114 shown in FIG. 11 corresponds to the reset renewing mode, and a step S120 shown in FIG. 12 corresponds to the emergency renewing mode. Further, a step S123 shown in FIG. 12 corresponds to the limp home mode.

If the accumulated drive time Te is equal to or more than the set time T0 (S101: YES), the step goes to a step S110 mentioned later. If the accumulated drive time Te is less than the set time T0 (S101: NO), the PM deposition amount within the DPF 50 is next estimated on the basis of the detected result from the differential pressure sensor 68, and it is determined whether the estimated result is equal to or more than a prescribed amount (a prescribed level) (S102). In the case that it is determined that the PM deposition amount is less than the prescribed amount (S102: NO), the step goes back to the step S101 and the normal drive mode is proceeded. The prescribed amount of the embodiment is set, for example, to 8 g/l. In the case that it is judged that the PM deposition amount is equal to or more than the prescribed amount (S102: NO), the execution of the renewing motion of the DPF 50 (the automatic auxiliary renewing mode) is advance notified to the operator, by starting the measurement on the basis of the time information of the timer 35 and making the renewal lamp 24 blink at a low speed (S103). In this case, a blinking frequency of the renewal lamp 24 is set, for example, to 1 Hz.

Next, it is determined whether the renewing switch 221 is pushed down (S104). If it is not locked under the push-down state (S104: OFF), it is determined whether a predetermined time (for example, 30 minutes) elapses after the start of the low-speed blinking of the renewal lamp 24 (S105). If the predetermined time does not elapse (S105: NO), the step goes back to the step S103 as it is. If the predetermined time elapses (S105: YES), the step goes to a step S116 mentioned later. Accordingly, in the steps S103 to S105, the control mode of the engine 70 stays in the normal drive mode in spite of the matter that the PM deposition amount is equal to or more than the prescribed amount, and the current drive state in the engine 70 is maintained. In other words, the change to the manual auxiliary renewing mode (which may be called as the renewing motion of the DPF 50, or the actuation of the renewing device) is inhibited. In this case, the blinking frequency of the renewal lamp 24 is set in such a manner as to be shorter in accordance with an increase of the PM deposition amount within the DPF 50 (the renewal lamp 24 blinks at short intervals in accordance with the increase of the PM deposition amount within the DPF 50). Accordingly, it is possible to visually appeal to the operator by the speed of the blinking of the renewal lamp 24.

In the step S104, if the renewing switch 221 is locked in the push-down state (S104: ON), after the renewal lamp 24 which blinks at the low speed is turned on (S106), the step executes the manual auxiliary renewing mode (S107). In the case that the renewal advance notification of the DPF 50 and the following renewal information of the DPF 50 (the fact that the renewing device is under actuation) are displayed by differentiating the blinking aspect of the renewal lamp 24 as mentioned above, the operator can previously assumes the shock of the fluctuation of the torque T and the change of the sound of the engine 70 which are generated thereafter, by the renewal advance notification of the DPF 50. Further, the operator can easily comprehend the change to the renewing motion of the DPF 50 by the renewal information of the DPF 50. Accordingly, it is possible to do away with the uncomfortable feeling of the operator which is caused by the renewing motion of the DPF 50. Further, since it is possible to recognize the renewal advance notification of the DPF 50 and the renewal information of the DPF 50 distinctively from each other only by the blinking aspect of the renewal lamp 24, it is easy to comprehend with or without the renewing motion of the DPF 50. In addition, it is not necessary to provide each of the renewal advance notifying means and the renewal informing means, and it is possible to contribute to a cost reduction of this kind of display device.

In the manual auxiliary renewing mode, the temperature of the exhaust gas is raised by increasing the load of the engine 70 by the restriction of the intake air amount or the exhaust gas amount using at least one of the intake air throttle device 81 and the exhaust gas throttle device 82, as mentioned above, and increasing the output of the engine 70 in conjunction with this. As a result, the PM within the DPF 50 is burnt and removed, and the PM collecting capacity of the DPF 50 is recovered. The manual auxiliary renewing mode of the embodiment is executed, for example, for about 20 minutes, and the opening degrees of the intake air throttle device 81 and the exhaust gas throttle device 82 are returned to the original state before narrowing them, after an elapse of the time.

After the execution of the manual auxiliary renewing mode, the PM deposition amount within the DPF 50 is estimated again on the basis of the detected result from the differential pressure sensor 68, and the step determines whether or not the estimated result is equal to or less than an allowable amount (S108). In the case that the step determines that the PM deposition amount is equal to or less than the allowable amount (S108: YES), an end of the manual auxiliary renewing mode is informed by turning off the renewal lamp 24 (S109), and the step goes back to the step S101 so as to execute the normal drive mode. The allowable amount of the embodiment is set, for example, to 4 g/l. In the case that the step determines that the PM deposition amount goes beyond the allowable amount (S108: NO), there comes to a state in which the PM within the DPF 50 is not sufficiently removed (the clogged state is not improved) in spite of the execution of the manual auxiliary renewing mode. Accordingly, the measurement on the basis of the time information of the timer 35 is started, the renewal lamp 24 is blinked at a low speed (S111) and the execution of the renewing motion of the DPF 50 (the reset renewing mode) is advance notified to the operator. In this case, a blinking frequency of the renewal lamp 24 is set, for example, to 1 Hz, in the same manner as the case of the manual auxiliary renewing mode.

Next, it is determined whether the renewing switch 221 is pushed down (S111), and if it is not locked in the pushed-down state (S111: OFF), it is determined whether a predetermined time (for example, 30 minutes) elapses after starting the blinking of the renewal lamp 24 at the low speed (S112). If the predetermined time does not elapse (S112: NO), the step goes back to the step S110 as it is. If the predetermined time elapses (S112: YES), the step goes to a step S116 mentioned later. Accordingly, in the steps S110 to S112, the current drive state in the engine 70 is maintained in spite of the fact that the clogged state of the DPF 50 is not improved, and the change to the reset renewing mode is inhibited. Further, even in this case, the blinking frequency of the renewal lamp 24 is set such as to be shorter in accordance with the increase of the PM deposition amount within the DPF 50.

In the step S111, if the renewing switch 221 is locked in the push-down state (S111: ON), after the renewal lamp 24 which blinks at the low speed (S113) is turned on, the reset renewing mode is executed (S114). In the reset renewing mode, as mentioned above, the temperature of the exhaust gas within the DPF 50 is raised by supplying the fuel into the DPF 50 by the post injection E of the common rail system 117 and burning the fuel by the diesel oxidation catalyst 53. As a result, the PM within the DPF 50 is forcibly burnt and removed, and the PM collecting capacity of the DPF 50 is recovered. The reset renewing mode of the embodiment is executed, for example, for about 30 minutes, and the common rail system 117 does not carry out the post injection E after the elapse of the time. In this case, if the reset renewing mode is executed, the accumulated drive time Te of the engine 70 is temporarily reset, and is newly measured by using the time information of the timer 35.

In this case, it may be structured such that the rotating speed N under the idling state in the engine 70 is maintained higher than a low idle rotating speed (a predetermined low rotating speed) by adjusting an injection state (an injection pressure, an injection timing and an injection period) of the fuel to each of the cylinders on the basis of an electronic control of the common rail system 117 under execution of the manual auxiliary renewing mode and the reset renewing mode. On the basis of the structure mentioned above, since it is easy to hold the temperature of the exhaust gas in a high temperature state, it is possible to reduce the execution frequency of the renewing motion of the DPF 50 and shorten the execution time, thereby contributing to suppression of the fuel consumption deterioration as well as achieving an efficiency of the renewal of the DPF 50. Particularly, if the high-idle rotating speed (the maximum rotating speed) is maintained, it is possible to further promote the efficiency of the renewal of the DPF 50. In this case, it is more preferable that a maintained rotating speed can be changed depending on an operating position of rotating speed setting means, for example, by providing the rotating speed setting means such as a dial type in an instrument panel.

After the execution of the reset renewing mode, it is determined whether the temperature TP of the exhaust gas within the DPF 50 which is detected by the DPF temperature sensor 26 is equal to or less than a previously set lower limit temperature TP0 (S115). The lower limit temperature TP0 comes to a temperature which is lower than the renewal boundary temperature (for example, about 300° C.). In other words, as the lower limit temperature TP0, nonrenewable temperature at which the PM is deposited in the soot filter 54 without being oxidized and removed is employed. The lower limit temperature TP0 of the embodiment is set, for example, to about 250° C. If the temperature TP of the exhaust gas within the DPF 50 exceeds the lower limit temperature TP0 (S115: NO), the step goes to the step S109 so as to turn off the renewal lamp 24, and the end of the reset renewing mode is informed. Further, the step goes back to the step S101 so as to execute the normal drive mode.

If the temperature TP of the exhaust gas within the DPF 50 is equal to or less than the lower limit temperature TP0 (S115: YES), there comes to a state in which the temperature of the exhaust gas is not raised and the PM within the DPF 50 is not removed (the clogged state is not improved) in spite of the execution of the reset renewing mode. Accordingly, the renewal lamp 24 is blinked at a high speed (S116), and the execution of the renewing motion of the DPF 50 (the emergency renewing mode) is advance notified to the operator. In this case, a blinking frequency of the renewal lamp 24 is set to a frequency which is different from the cases of the manual auxiliary renewing mode and the reset renewing mode. For example, the blinking frequency of the renewal lamp 24 for advance notifying the emergency renewing mode is set to 2 Hz. In the case that a predetermined time (for example, about 30 minutes) elapses without executing the manual auxiliary renewing mode and the reset renewing mode, the step goes to the step S116, and the renewal lamp 24 is blinked at a high speed (refer to the steps S105 and S112 in FIG. 11).

Next, the step determines whether or not both of the renewing switch 221 and the parking brake operating means 29 are under operation state (S117). This intends to inhibit the change to the emergency renewing mode until the operator intentionally stops the traveling of the working machine and the various works, in order to widely enhance the rotating speed N of the engine 70 in the emergency renewing mode. If both of the renewing switch 221 and the parking brake operating means 29 are in operation state (S117: YES), the renewal lamp 24 blinking at the high speed is turned on (S119) and thereafter the emergency renewing mode is executed (S120). In this case, only the on-off state of the renewing switch 221 may be determined, or only the on-off state of the parking brake operating means 29 may be determined. In this case, on the basis of the operation of both the renewing switch 221 and the parking brake operating means 29, more effect can be achieved as an interlock structure (a glitch preventing structure) with respect to the execution of the emergency renewing mode.

After the execution of the emergency renewing mode, it is determined whether the temperature TP of the exhaust gas within the DPF 50 which is detected by the DPF temperature sensor 26 is equal to or less than the lower limit temperature TP0 (S121). If the temperature TP of the exhaust gas within the DPF 50 exceeds the lower limit temperature TP0 (S121: NO), the step goes to the step S109 so as to turn off the renewal lamp 24, and the end of the emergency renewing mode is informed. Further, the step goes back to the step S101 so as to execute the normal drive mode.

If the temperature TP of the exhaust gas within the DPF 50 is equal to or less than the lower limit temperature TP0 (S121: YES), there comes to the PM excessively deposited state in which the exhaust gas temperature does not rise and the clogged state of the DPF 50 is not improved, in spite of the execution of the reset renewing mode. In this case, since there is a possibility of the PM runaway combustion, after a limp home flag LF (LF=1, S122) is set, the limp home mode is executed (S123). In the limp home mode, as mentioned above, the engine 70 is held in the minimum drive state by restricting the upper limit values Nmx and MIX of the output (the rotating speed N and the torque T) of the engine 70, and the drivable time Tmx of the engine 70. As a result, it is possible to secure a minimum traveling function in the working machine.

In this case, in the step S117, if both of the renewing switch 221 and the parking brake operating means 29 are not in the on state (S117: NO), it is determined whether a predetermined time (for example, 30 minutes) elapses after the start of the high-speed blinking of the renewal lamp 24 (S118). If the predetermined time does not elapse (S118: NO), the step goes back to the step S118 as it is. If the predetermined time elapses (S118: YES), there is understood that the DPF 50 is in the PM excessively deposited state because the emergency renewing mode is failed in spite of the fact that the emergency renewing mode should be executed. Accordingly, after the limp home flag LF (LF=1, S122) is set, the limp home mode is executed (S123).

Figure 13:
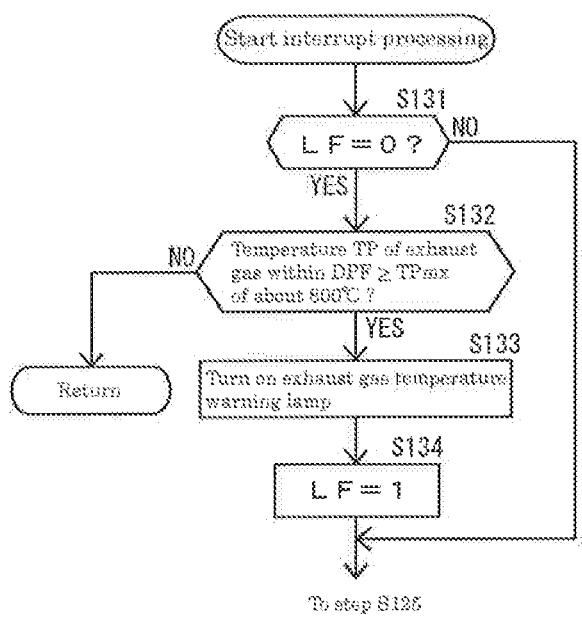
FIG. 13 is a flow chart showing an interrupt processing.

In this case, in the second embodiment, an interrupt processing shown in FIG. 13 is executed under execution of the renewing control of the DPF 50, however, since the interrupt processing of the second embodiment is structured such as to check the detected result of the DPF temperature sensor 26 at appropriate time intervals, absolutely in the same manner as that of the first embodiment (refer to FIG. 8), a description thereof will be omitted here.

(6) Second Summary

As is apparent from the above description and FIG. 9 and FIG. 11, since the renewal advance notifying means 24 which is actuated in the case that the clogged state of the exhaust gas purification device 50 becomes equal to or more than the prescribed level, and the renewal admittance input means 221 which allows the execution of the auxiliary renewing mode or the forced renewing mode are provided, and it is structured such as to execute the auxiliary renewing mode or the forced renewing mode in the case that the allowing operation of the renewal admittance input means 221 is carried out under operation of the renewal advance notifying means 24, it is possible to inhibit the renewing motion of the exhaust gas purification device 50 by preventing the allowing operation of the renewal admittance input means 221. In other words, it is possible to inhibit the renewing motion of the exhaust gas purification device 51) on the basis of the operator's intention depending on the state of the working machine to which the engine is mounted. Accordingly, there can be achieved the effect that it is possible to smoothly carry out the careful work which the operator executes on the basis of the engine sound, in spite of the fact that it is possible to execute the renewing control which recovers the particulate matter collecting capacity of the exhaust gas purification device 50. In other words, it is possible to do away with the defect of the renewing motion of the exhaust gas purification device 50 which may obstruct the careful work.

As is apparent from the above description and FIG. 9 and FIG. 11, since it is structured such that the rotating speed N of the engine 70 is made higher than the low idle rotating speed in the idling state of the engine 70, under execution of the auxiliary renewing mode or the forced renewing mode, it is easy to hold the temperature of the exhaust gas from the engine 70 in the high temperature state. Accordingly, it is possible to reduce the execution frequency of the renewing motion of the exhaust gas purification device 50 and shorten the execution time, and it is possible to contribute to the suppression of the fuel consumption deterioration as well as achieving the efficiency of the renewal of the exhaust gas purification device 50.

As is apparent from the above description and FIG. 9 and FIG. 11, since the rotating speed N of the engine 70 in the idling state is the high idle rotating speed which is higher than the low idle rotating speed under the execution of the auxiliary renewing mode or the forced renewing mode, it is possible to set the temperature of the exhaust gas from the engine 70 to the higher state. Accordingly, it is possible to further promote the efficiency of the renewal of the exhaust gas purification device 50.

As is apparent from the above description and FIG. 9 and FIG. 11 to FIG. 13, since it is structured such that the mode is returned to the normal drive mode in the case that the clogged state of the exhaust gas purification device 50 is improved after the execution of the auxiliary renewing mode or the forced renewing mode, it is not necessary for the operator to carry out the returning operation, for example, for changing the mode. Therefore, it is possible to save the labor hour and lighten the operation load of the operator.

(7) Others

The present invention is not limited to the embodiments mentioned above, but can be embodied into various aspects. The structure of each of the portions is not limited to the illustrated embodiment, but can be variously changed within a range which does not deflect from the scope of the present invention.

REFERENCE SIGNS LIST

11 ECU
21 Emergency switch
23 Exhaust gas temperature warning lamp
24 Renewal lamp
26 DPF temperature sensor
27 Renewal inhibition button
28 Renewal inhibition lamp
29 Parking brake operating means
50 DPF (exhaust gas purification device)
70 Engine
117 Common rail system
120 Common rail
221 Renewing switch

The invention claimed is:

1. An exhaust gas purification system comprising:
   an exhaust gas purification device which is arranged in an exhaust gas route of a common rail type engine;
   a first throttle arranged in an intake system of said engine and adjustable to define a predetermined first opening degree through which air passes;
   a second throttle arranged in an exhaust system of said engine and adjustable to define a predetermined second opening through which exhaust gas passes; and
   a controller configured to control said first throttle and second throttle to define respectively said predetermined first opening degree and said predetermined second opening degree, said controller being further configured to determine an auxiliary renewing mode and a forced renewing mode for renewing said exhaust gas purification device;
   wherein when a clogged state of the exhaust gas purification device becomes equal to or more than a prescribed level, the controller executes said auxiliary renewing mode so as to define one of said predetermined first opening degree and said predetermined second opening degree to be an opening degree causing a raising of temperature of the exhaust gas;
   wherein when the clogged state of the exhaust gas purification device is not improved even by said raising said temperature of said exhaust gas during said executing the auxiliary renewing mode, the controlled is configured to execute the forced renewing mode during which the controller is configured to control a post injection of fuel; and into the exhaust gas purification device
   wherein when the clogged state of the exhaust gas purification device is not improved even by executing the forced renewing mode, the controller is configured to execute an emergency renewing mode during which the fuel is supplied into the exhaust gas purification device by the post injection and a rotating speed of the engine is maintained at a predetermined value.

2. The exhaust gas purification system according to claim 1, wherein when an accumulated drive time of the engine is equal to or more than a set time which is previously set, the controller is configured to change mode to the forced renewing mode regardless of the clogged state of the exhaust gas purification device.

3. The exhaust gas purification system according to claim 2, wherein the accumulated drive time of the engine is reset and is newly started measuring after the execution of the forced renewing mode.

4. The exhaust gas purification system according to claim 1, wherein when the temperature of an exhaust gas within the exhaust gas purification device becomes equal to or more than an abnormal temperature after the execution of the emergency renewing mode, the controller is configured to execute a limp home mode which limits upper limit threshold values of a rotating speed and a torque of the engine, and a drivable time of the engine.

5. The exhaust gas purification system according to claim 4, wherein the controller is configured upon entry into the limp home mode to maintain the limp home mode upon restarting the engine.

6. The exhaust gas purification system according to claim 4, wherein while executing the limp home mode in the case that the current rotating speed and torque in the engine are greater than the upper limit threshold values, the controller is configured to lower the rotating speed and the torque of the engine little by little to the upper limit threshold values.

7. The exhaust gas purification system according to claim 4, further comprising abnormally high temperature informing means which is actuated in the case that the temperature of the exhaust gas within the exhaust gas purification device is equal to or higher than the abnormal temperature.

8. The exhaust gas purification system according to claim 1, further comprising renewal advance notifying means which is actuated in the case that the clogged state of the exhaust gas purification device becomes equal to or more than a prescribed level, and renewal admittance input means which allows the controller to execute the auxiliary renewing mode or the forced renewing mode, wherein
the controller is configured to execute the auxiliary renewing mode or the forced renewing mode when an allowing operation of the renewal admittance input means is carried out under actuation of the renewal advance notifying means.

9. The exhaust gas purification system according to claim 8, wherein the rotating speed of the engine is made higher than a low idle rotating speed, in an idling state of the engine, under execution of the auxiliary renewing mode or the forced renewing mode.

10. The exhaust gas purification system according to claim 9, wherein the rotating speed of the engine in the idling state is a high idle rotating speed which is higher than the low idle rotating speed, under execution of the auxiliary renewing mode or the forced renewing mode.

11. The exhaust gas purification system according to claim 8, wherein in the case that the clogged state of the exhaust gas purification device is improved after the execution of the auxiliary renewing mode or the forced renewing mode, the controller is configured to implement a normal operation mode.

12. The exhaust gas purification system according to claim 5, further comprising abnormally high temperature informing means which is actuated in the case that the temperature of the exhaust gas within the exhaust gas purification device is equal to or higher than the abnormal temperature.

13. The exhaust gas purification system according to claim 6, further comprising abnormally high temperature informing means which is actuated in the case that the temperature of the exhaust gas within the exhaust gas purification device is equal to or higher than the abnormal temperature.

14. The exhaust gas purification system according to claim 9, wherein when the clogged state of the exhaust gas purification device is improved after the execution of the auxiliary renewing mode or the forced renewing mode, the controller is configured to implement a normal operation mode.

15. The exhaust gas purification system according to claim 10, wherein when the clogged state of the exhaust gas purification device is improved after the execution of the auxiliary renewing mode or the forced renewing mode, the controller is configured to implement a normal operation mode.

* * * * *